United States Patent
Seol et al.

(10) Patent No.: US 9,024,875 B2
(45) Date of Patent: May 5, 2015

(54) IMAGE DISPLAY APPARATUS AND METHOD FOR OPERATING THE SAME

(75) Inventors: Seongwoon Seol, Seoul (KR); Miyeon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 13/587,540

(22) Filed: Aug. 16, 2012

(65) Prior Publication Data

US 2013/0076736 A1    Mar. 28, 2013

(30) Foreign Application Priority Data

Sep. 23, 2011   (KR) .................. 10-2011-0096433

(51) Int. Cl.
- *G06F 3/0346* (2013.01)
- *G06F 3/038* (2013.01)
- *G06F 3/0338* (2013.01)
- *H04N 13/00* (2006.01)

(52) U.S. Cl.
CPC ................................ *H04N 13/0022* (2013.01)

(58) Field of Classification Search
CPC .......... H04N 13/0011; H04N 13/0014; H04N 13/0018; H04N 13/0022; H04N 13/00222; H04N 13/00225; H04N 13/00228
USPC ................ 345/156–159; 348/42–51
See application file for complete search history.

(56) References Cited

U.S. PATENT DOCUMENTS

| | | | |
|---|---|---|---|
| 2002/0008906 A1 | 1/2002 | Tomita | |
| 2004/0238732 A1* | 12/2004 | State et al. | 250/250 |
| 2008/0240549 A1 | 10/2008 | Koo et al. | |
| 2010/0095206 A1 | 4/2010 | Kim | |
| 2010/0165081 A1* | 7/2010 | Jung et al. | 348/46 |
| 2010/0253623 A1* | 10/2010 | Wei et al. | 345/158 |
| 2011/0018976 A1* | 1/2011 | Park | 348/51 |
| 2011/0037609 A1* | 2/2011 | Kim et al. | 340/825.22 |
| 2011/0102321 A1* | 5/2011 | Son | 345/158 |
| 2011/0115880 A1* | 5/2011 | Yoo et al. | 348/42 |
| 2011/0126159 A1 | 5/2011 | Ko et al. | |
| 2011/0265118 A1* | 10/2011 | Choi et al. | 725/37 |
| 2012/0050502 A1 | 3/2012 | Chi et al. | |
| 2012/0274626 A1* | 11/2012 | Hsieh | 345/419 |

FOREIGN PATENT DOCUMENTS

| | | |
|---|---|---|
| CN | 101739804 A | 6/2010 |
| CN | 101938670 A | 1/2011 |
| EP | 2 268 045 A1 | 12/2010 |
| KR | 1020100036985 * | 12/2010 |
| WO | WO 2010/151044 A2 | 12/2010 |

* cited by examiner

*Primary Examiner* — Viet Pham
*Assistant Examiner* — Stefan M Oehrlein
(74) *Attorney, Agent, or Firm* — Birch, Stewart, Kolasch & Birch, LLP

(57) ABSTRACT

An apparatus and method are described for displaying images to a user. The apparatus may include a display configured to display a three-dimensional (3D) image and a pointer in correspondence with movement of a remote controller. The apparatus may further include an interface and a controller. The interface may be configured to provide a shift input for moving the pointer in correspondence with movement of the remote controller, and receive a depth change input for changing a depth value of an object displayed within a reference distance from an area to which the pointer has moved. The controller may be configured to extract a depth value of the object and change the depth value according to the depth change input to control display of a 3D image based on the changed depth value.

13 Claims, 28 Drawing Sheets

FIG. 4
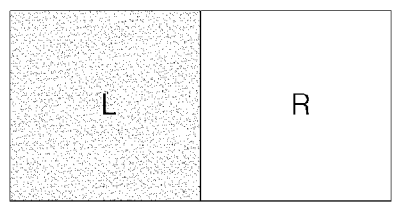
(a)
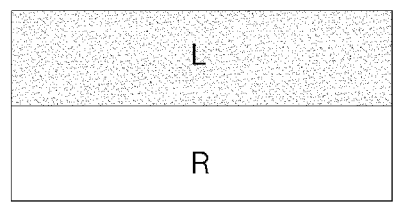
(b)
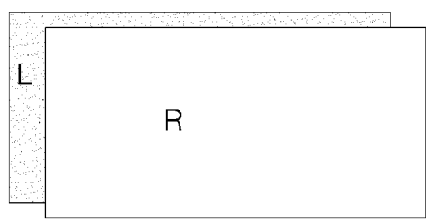
(c)
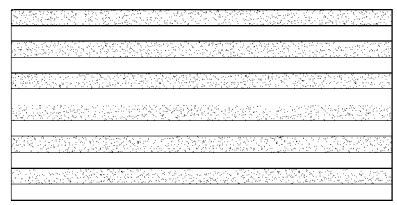
(d)
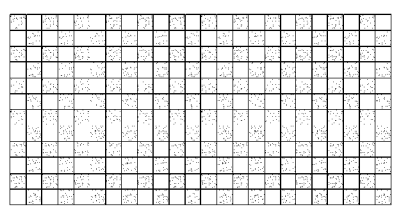
(e)

FIG. 5
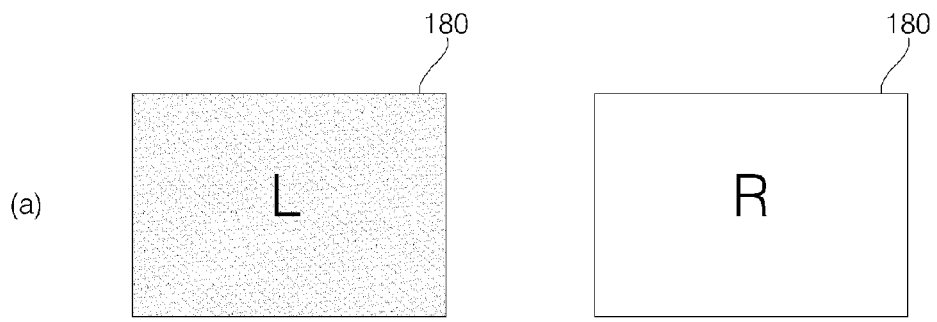
(a)
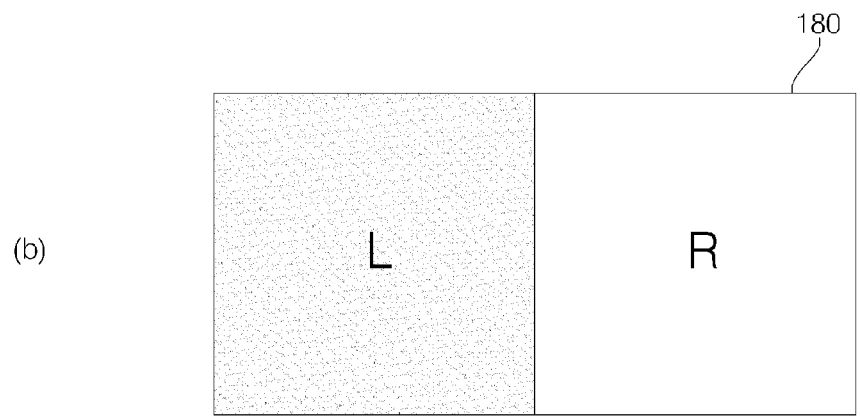
(b)
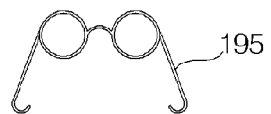

FIG. 12a
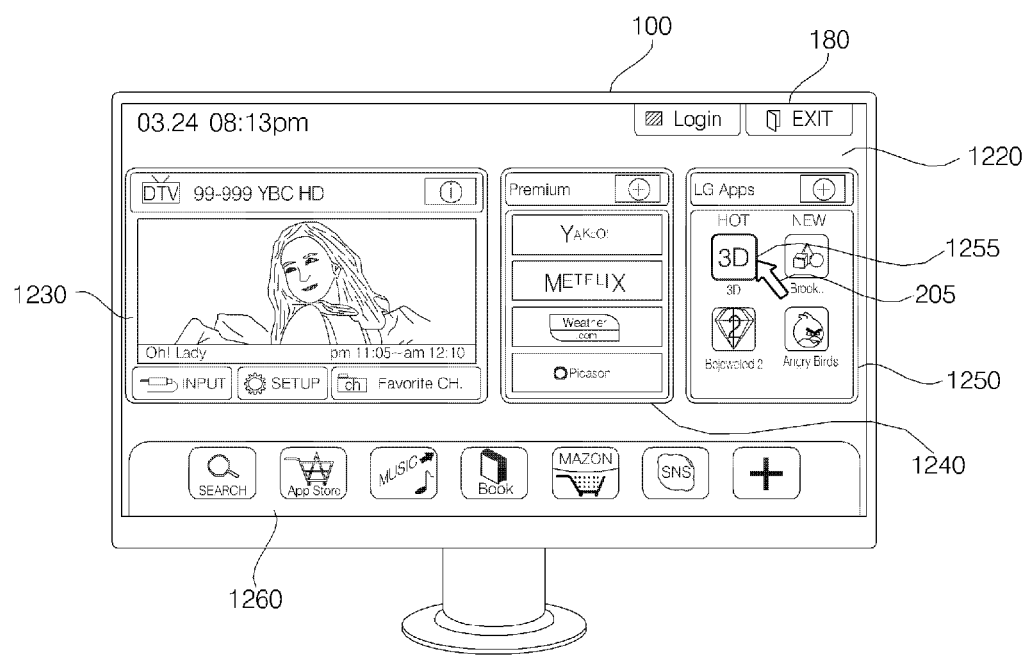
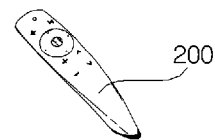

FIG. 12c
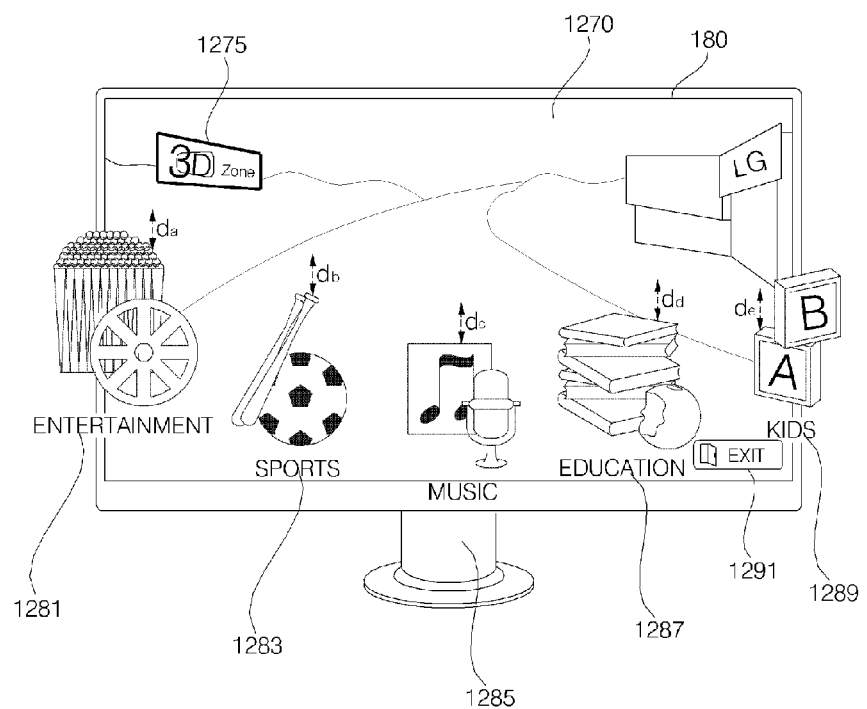

FIG. 15
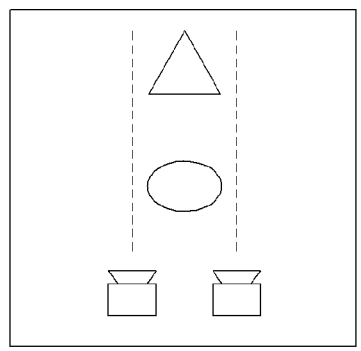
(a)
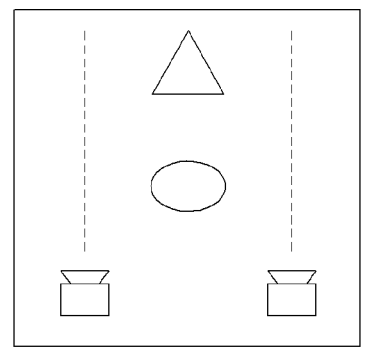
(b)

FIG. 17
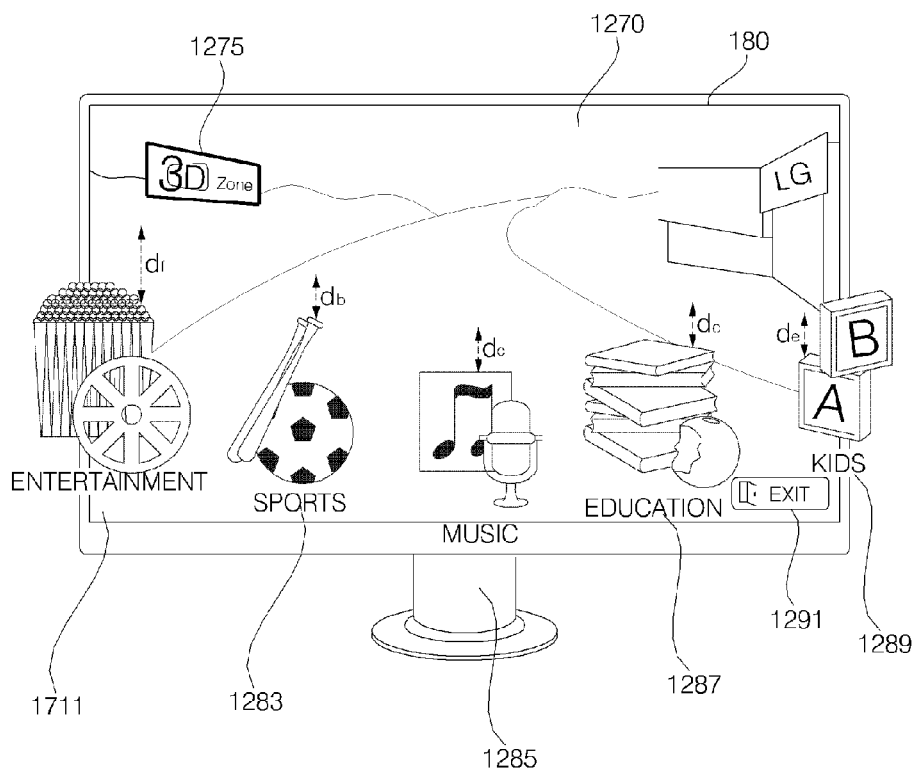
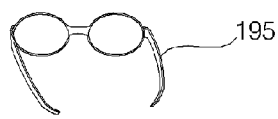

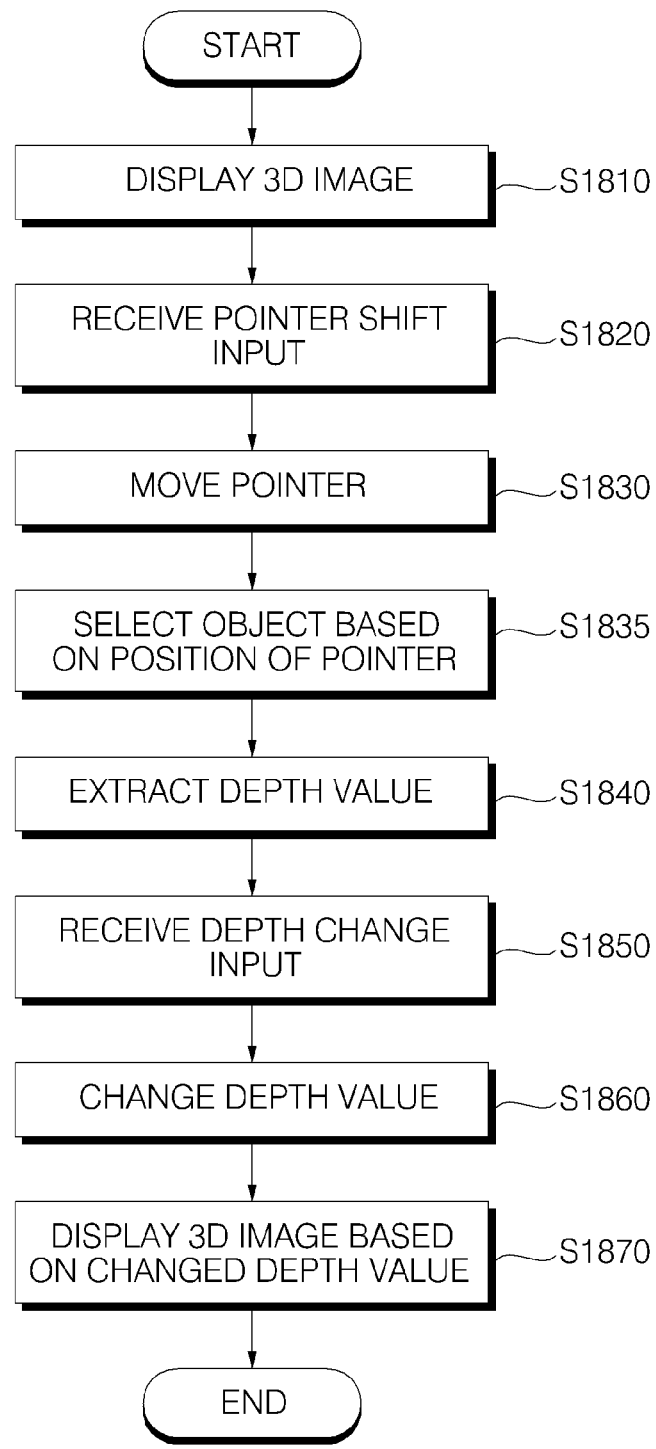

(a)  (b)

IMAGE DISPLAY APPARATUS AND METHOD FOR OPERATING THE SAME

CROSS-REFERENCE TO RELATED APPLICATION

This application claims the benefit of Korean Patent Application No. 10-2011-0096433, filed on Sep. 23, 2011 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which increase user convenience.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can perform three-dimensional (3D) setting easily in various manners.

In accordance with an aspect of the present invention, the above and other objects can be accomplished by the provision of a method for operating an image display apparatus, including displaying a three-dimensional (3D) image, receiving a depth change input for changing a depth value of at least a part of the 3D image, changing the depth value according to the depth change input, and displaying a 3D image based on the changed depth value.

In accordance with another aspect of the present invention, there is provided an image display apparatus including a display for displaying a three-dimensional (3D) image, an interface for receiving a depth change input for changing a depth value of at least a part of the 3D image, and a controller for changing the depth value according to the depth change input. The controller controls display of a 3D image based on the changed depth value.

BRIEF DESCRIPTION OF THE DRAWINGS

The above and other objects, features and other advantages of the present invention will be more clearly understood from the following detailed description taken in conjunction with the accompanying drawings, in which:

FIG. 4 illustrates three-dimensional (3D) formats;

FIG. 5 illustrates operations of a viewing device according to 3D formats illustrated in FIG. 4;

FIGS. 12 to 17 are views referred to for describing various examples of the method for operating the image display apparatus, illustrated in FIG. 11;

FIG. 18 is a flowchart illustrating a method for operating the image display apparatus according to another embodiment of the present invention;

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
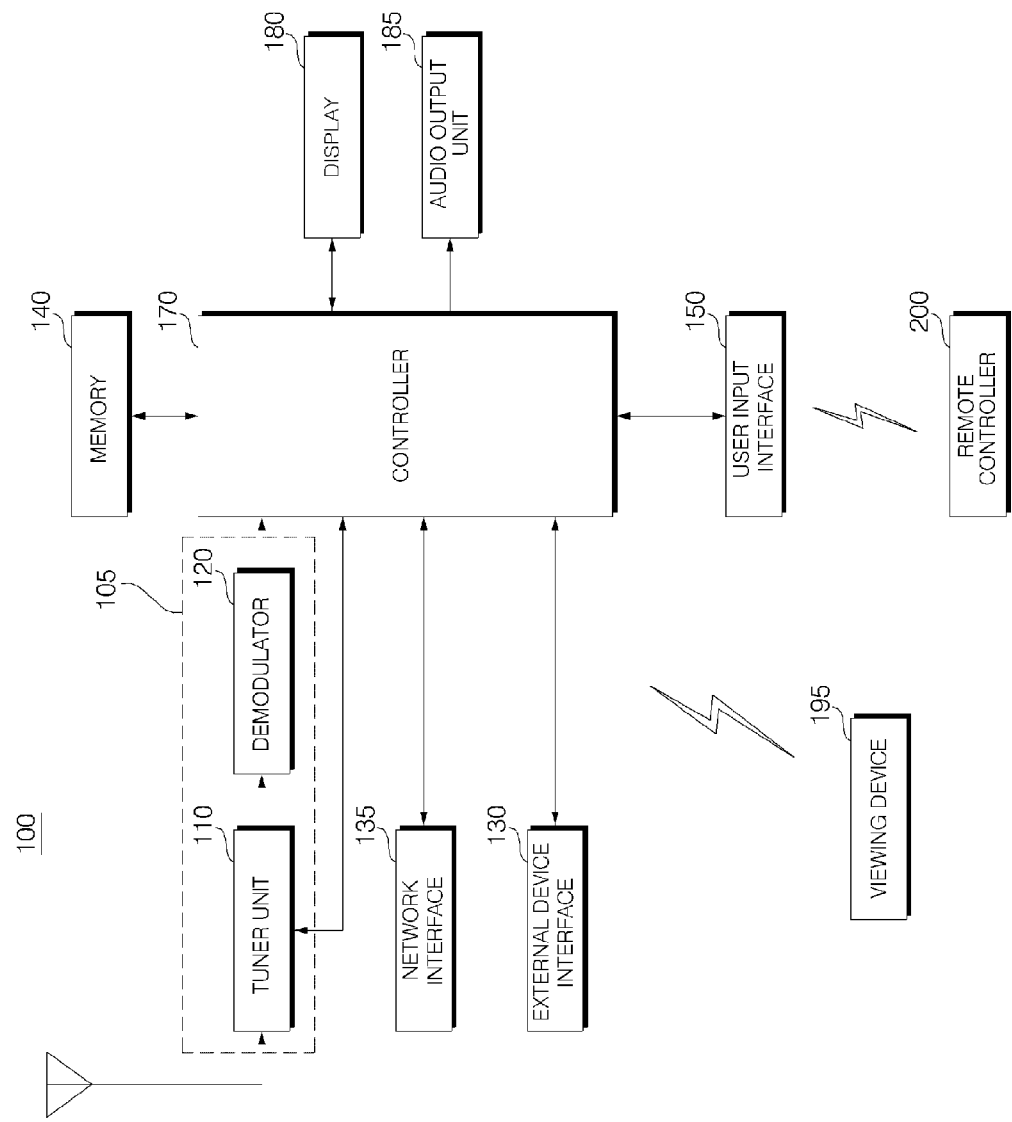
FIG. 1 is a block diagram of an image display apparatus according to an embodiment of the present invention.

FIG. 1 is a block diagram of an image display apparatus according to an embodiment of the present invention.

Referring to FIG. 1, an image display apparatus 100 according to an embodiment of the present invention includes a broadcasting receiver 105, an external device interface 130, a network interface 135, a memory 140, a user input interface 150, a sensor unit (not shown), a controller 170, a display 180, an audio output unit 185, and a viewing device 195.

The broadcasting receiver 105 may include a tuner unit 110, a demodulator 120, and a network interface 130. As needed, the broadcasting receiver 105 may be configured so as to include only the tuner unit 110 and the demodulator 120 or only the network interface 130.

The tuner unit 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner unit 110 downconverts the selected RF broadcast signal into a digital IF signal, DIF. On the other hand, if the selected RF broadcast signal is an analog broadcast signal, the tuner unit 110 downconverts the selected RF broadcast signal into an analog baseband A/V signal, CVBS/SIF. That is, the tuner unit 110 may be a hybrid tuner capable of processing not only digital broadcast signals but also analog broadcast signals. The analog baseband A/V signal CVBS/SIF may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The tuner unit 110 may include a plurality of tuners for receiving broadcast signals on a plurality of channels. Alternatively, the tuner unit 110 may be implemented into a single tuner for simultaneously receiving broadcast signals on a plurality of channels.

The demodulator 120 receives the digital IF signal DIF from the tuner unit 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 130 may serve as an interface between a connected external device and the image display apparatus 100. For interfacing, the external device interface 130 may include an A/V Input/Output (I/O) unit (not shown) and/or a wireless communication module (not shown).

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 transmits and receives signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet. The network interface 135 may receive content or data from the Internet, a Content Provider (CP), or a Network Provider (NP).

The memory 140 may store various programs necessary for the controller 170 to process and control signals, and may also store processed video, audio and data signals.

The memory 140 may temporarily store a video, audio and/or data signal received from the external device interface 130. The memory 140 may store information about broadcast channels by the channel-add function such as a channel map.

While the memory 140 is shown in FIG. 1 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200, provide the controller 170 with user input signals received from local keys (not shown), such as inputs of a power key, a channel key, and a volume key, and a setting key, transmit a control signal received from a sensor unit (not shown) for sensing a user gesture to the controller 170, or transmit a signal received from the controller 170 to the sensor unit.

The controller 170 may demultiplex the stream signal TS received from the tuner unit 110, the demodulator 120, or the external device interface 130 into a number of signals and process the demultiplexed signals into audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 1, the controller 170 may include a demultiplexer (DEMUX) and a video processor, which will be described later with reference to FIG. 3.

In addition, the controller 170 may provide overall control to the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may also control the display 180 to display images. The image displayed on the display 180 may be a two-Dimensional (2D) or three-Dimensional (3D) still image or moving picture.

The controller 170 may control a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded together with a decoded image. The controller 170 may display a thumbnail list including a plurality of received thumbnail images on the display 180.

The thumbnail list may be displayed on a part of the display 180 with an image displayed on the display 180, that is, as a compact view, or the thumbnail list may be displayed in full screen on the display 180. The thumbnail images of the thumbnail list may be updated sequentially.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc.

As special 3D glasses, polarized glasses operate in a passive manner, whereas shutter glasses operate in an active manner. Also, HMD types may be categorized into passive ones and active ones.

The viewing device 195 may be 3D glasses that enable the user to view 3D images. The 3D glasses 195 may be passive-type polarized glasses, active-type shutter glasses, or an HMD type.

For example, if the viewing device 915 is polarized glasses, it may include a left polarized lens for the left eye and a right polarized lens for the right eye.

In another example, if the viewing device 915 is shutter glasses, its left and right lens may be alternately opened or closed.

Meanwhile, the viewing device may be 2D glasses that enable different users to view different images.

For example, if the viewing device 195 is polarized glasses, the same polarized glasses may be used for the left and right lenses. That is, the viewing device 195 may have left-eye polarized glasses or right-eye polarized glasses for both the left and right lenses.

In another example, if the viewing device 195 is shutter glasses, the left and right lenses may be opened at the same time. Specifically, the left and right lenses of the viewing device 195 may be opened simultaneously during a first time interval and closed simultaneously during a second time interval. Or the left and right lenses of the viewing device 195 may be opened simultaneously during the second time interval and closed simultaneously during the first time interval.

The display 180 may also be a touch screen that can be used not only as an output device but also as an input device.

The audio output unit 185 may receive a processed audio signal from the controller 170 and output the received audio signal as voice.

The camera module (not shown) captures a user. The camera module may include, but not limited to, a single camera. When needed, the camera module may include a plurality of cameras. The camera module may be embedded above the display 180 in the image display apparatus 100, or may be separately configured. Image information captured by the camera module may be provided to the controller 170.

The controller 170 may sense a user's gesture from a captured image received from the camera module or from signals received from the sensor unit (not shown) alone or in combination.

The remote controller 200 transmits a user input to the user input interface 150. For the transmission of a user input, the remote controller 200 may operate based on various communication standards such as Bluetooth, RF, InfraRed (IR), Ultra WideBand (UWB), and ZigBee. In addition, the remote controller 200 may receive a video signal, audio signal and/or data signal from the user input interface 150 and output the received signal as an image or sound.

The above-described image display apparatus 100 may be a fixed or mobile digital broadcast receiver.

The image display apparatus 100 as set forth herein may be any of a TV receiver, a monitor, a mobile phone, a smart phone, a laptop computer, a digital broadcast terminal, a Personal Digital Assistant (PDA), a Portable Multimedia Player (PMP), etc.

The block diagram of the image display apparatus 100 illustrated in FIG. 1 is an exemplary embodiment of the present invention. The image display apparatus 100 is shown in FIG. 1 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 1, the image display apparatus 100 may be configured so as to receive and playback video content through the network interface 130 or the external device interface 135, without the tuner unit 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 2A and 2B.

Figure 2A:
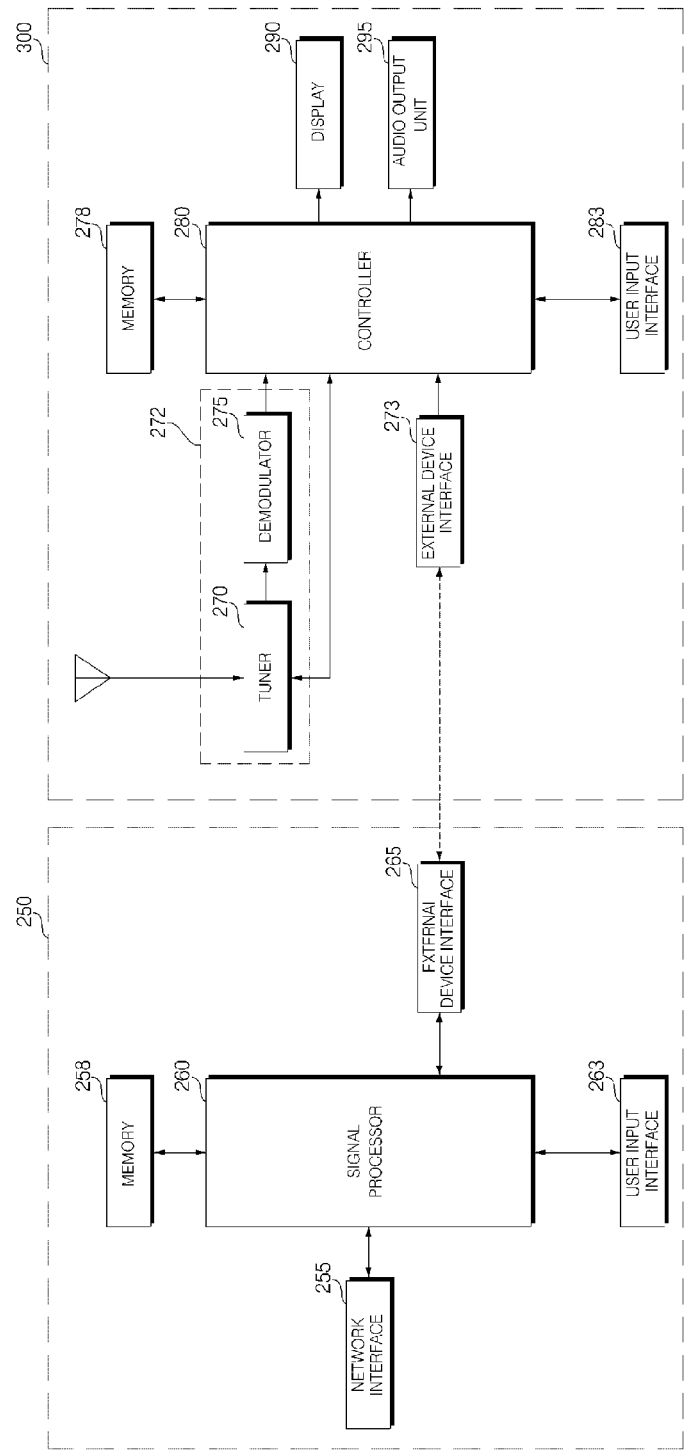
FIGS. 2A and 2B are block diagrams of a set-top box and a display device according to embodiments of the present invention.
Figure 2B:
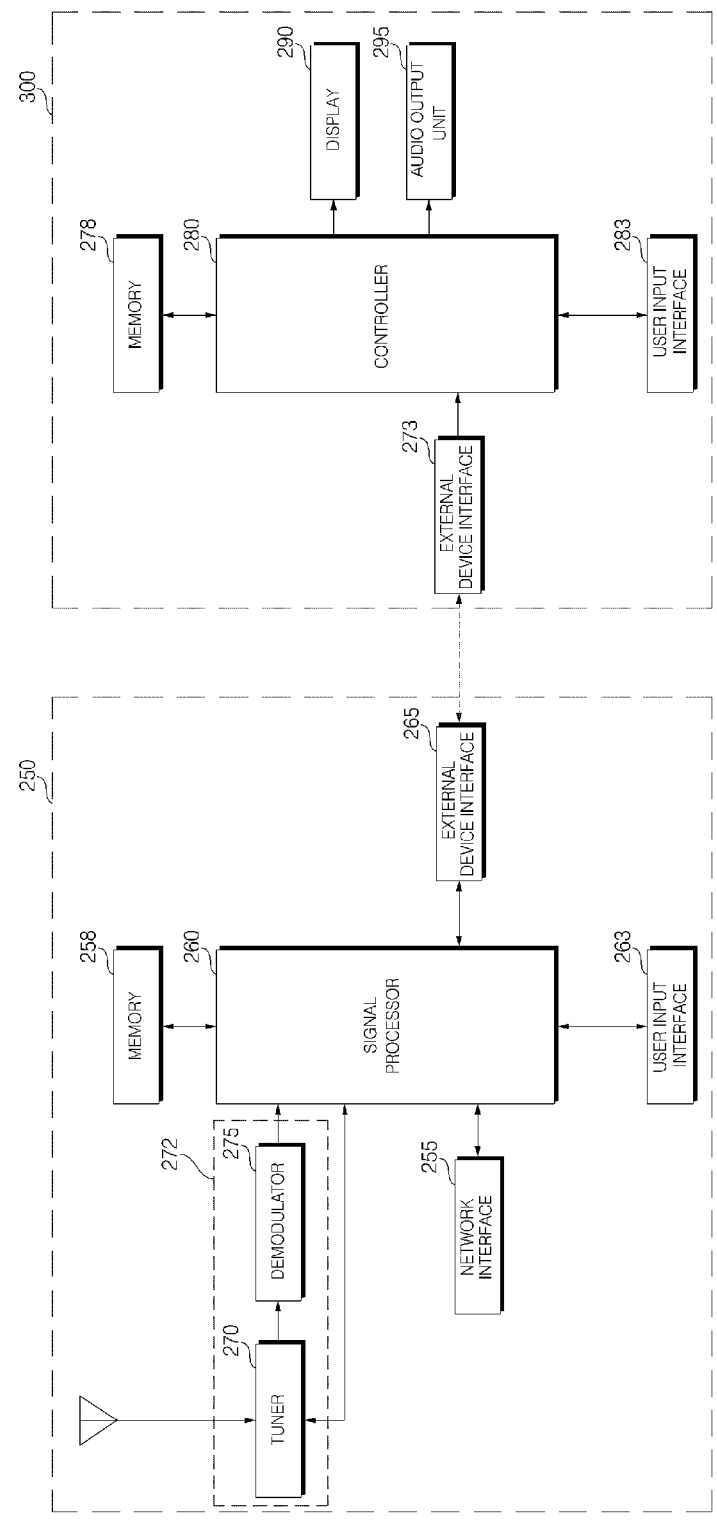

FIGS. 2A and 2B are block diagrams of a set-top box and a display device according to embodiments of the present invention.

Referring to FIG. 2A, a set-top box 250 and a display device 300 may transmit or receive data wirelessly or by wire. The following description focuses mainly on the difference between FIG. 1 and FIG. 2A.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and may temporarily store a video, audio and/or data signal received from the external device interface 265 or the network interface 255.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller 200 and may output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a broadcast receiver 272, an external device interface 273, a memory 278, a controller 280, a user input interface 283, a display 290, and an audio output unit 295.

The broadcast receiver 272 may include a tuner 270 and a demodulator 275.

The tuner 270, the demodulator 275, the memory 278, the controller 280, the user input interface 283, the display 290, and the audio output unit 295 are identical respectively to the tuner unit 110, the demodulator 120, the memory 140, the controller 170, the user input interface 150, the display 180, and the audio output unit 185 illustrated in FIG. 1 and thus a description thereof is not provided herein.

The external device interface 273 serves as an interface between the display device 300 and a wirelessly or wiredly connected external device, particularly the set-top box 250, for data transmission or reception.

Hence, a video signal or an audio signal received through the set-top box 250 is output to the display 290 or the audio output unit 295 through the controller 280.

Referring to FIG. 2B, the configuration of the set-top box 250 and the display device 300 illustrated in FIG. 2B is similar to that of the set-top box 250 and the display device 300 illustrated in FIG. 2A, except that the broadcast receiver 272 resides in the set-top box 250, not in the display device 300. Thus the following description is given focusing on such difference.

The signal processor 260 may process a broadcast signal received through the tuner 270 and the demodulator 275. The user input interface 263 may receive a channel selection input, a channel store input, etc.

While the audio output unit 815 illustrated in FIG. 1 is not shown in the set-top box 250 in FIGS. 2A and 2B, the set-top box 250 may include an audio output unit in the embodiments of the present invention.

Figure 3:
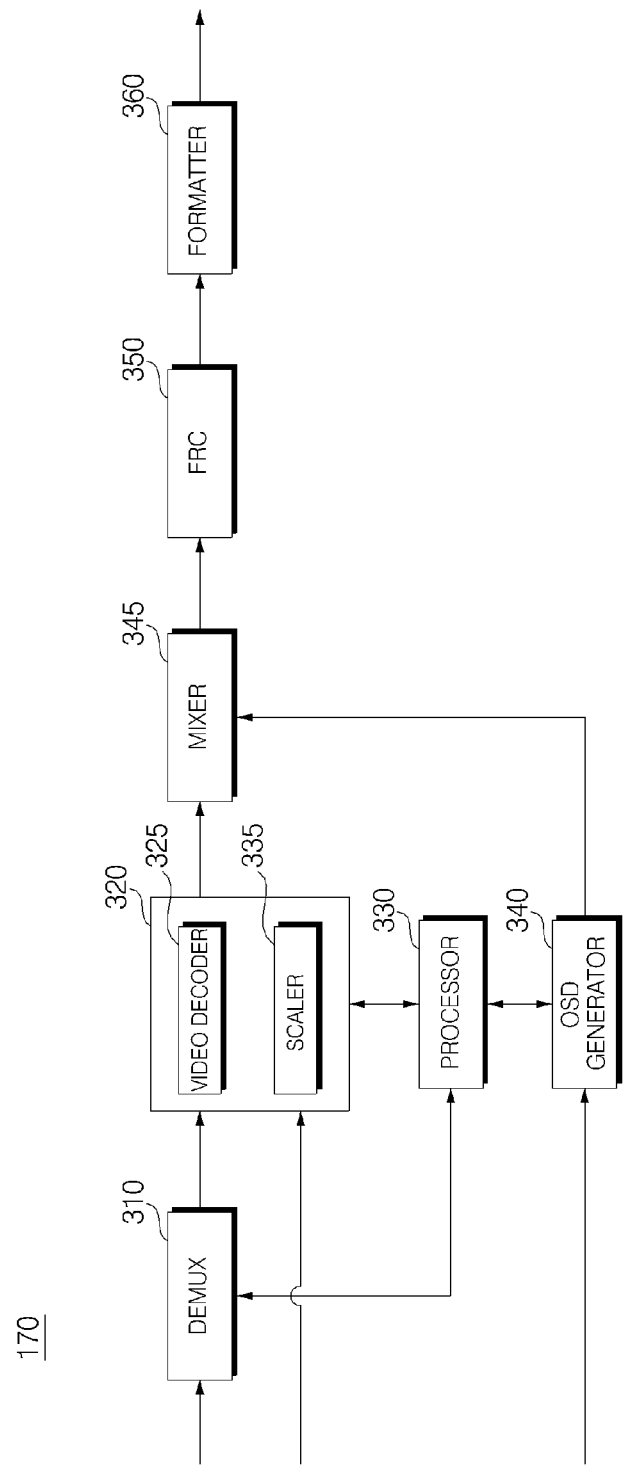
FIG. 3 is a block diagram of a controller illustrated in FIG. 1.

FIG. 3 is a block diagram of a controller illustrated in FIG. 1, FIG. 4 illustrates 3D formats, and FIG. 5 illustrates operations of a viewing device according to a 3D format illustrated in FIG. 4.

Referring to FIG. 3, the controller 170 may include a DEMUX 310, a video processor 320, a processor 330, an OSD generator 340, a mixer 350, a Frame Rate Converter (FRC) 350, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The decoded video signal processed by the video processor 320 may be a 2D video signal, a 3D video signal, or a combination of both.

For example, it may be determine whether an external video signal received from an external device or a video signal included in a broadcast signal received from the tuner unit 110 is a 2D signal, a 3D signal, or a combination of both. Accordingly, the controller 170, particularly the video processor 320 processes the video signal and outputs a 2D video signal, a 3D video signal, or a combination of both.

The decoded video signal from the video processor 320 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, 3D formats illustrated in FIG. 4 are available. The 3D formats are a side-by-side format (FIG. 4(a)), a top/bottom format (FIG. 4(b)), a frame sequential format (FIG. 4(c)), an interlaced format (FIG. 4(d)), and a checker box format (FIG. 4(e)). A left-eye image L and a right-eye image R are arranged side by side in the side by side format. The left-eye image L and the right-eye image R are stacked vertically in the top/bottom format, while they are arranged in time division in the frame sequential format. In the interlaced format, the left-eye image L and the right-eye image R alternate line by line. The left-eye image L and the right-eye image R are mixed on a box basis in the checker box format.

The processor 330 may provide overall control to the image display apparatus 100 or the controller 170. For example, the processor 330 may control the tuner unit 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

Further, the OSD generator 340 may generate a pointer to be displayed on the display 180 based on a pointing signal received from the remote controller 200. Especially, the pointer may be generated from a pointing signal processor (not shown), which may reside in the OSD generator 240. Obviously, the pointing signal processor may be configured separately.

The mixer 345 may mix the decoded video signal processed by the video processor 320 with the OSD signal generated from the OSD generator 340. The OSD signal and the decoded video signal each may include at least one of a 2D signal or a 3D signal. The mixed video signal is provided to the FRC 350.

The FRC 350 may change the frame rate of the mixed video signal or simply output the mixed video signal without frame rate conversion.

The formatter 360 may arrange left-eye and right-eye video frames of the frame rate-converted 3D image and may also output a synchronization signal Vsync to open the left or right lens of the viewing device 195.

The formatter 360 may separate a 2D video signal and a 3D video signal from the mixed video signal of the OSD signal and the decoded video signal received from the mixer 345.

Herein, a 3D video signal refers to a signal including a 3D object such as a Picture-In-Picture (PIP) image (still or moving), an EPG that describes broadcast programs, a menu, a widget, an icon, text, an object within an image, a person, a background, or a Web page (e.g. from a newspaper, a magazine, etc.).

The formatter 360 may change the format of the 3D video signal, for example, to one of the 3D formats illustrated in FIG. 4. Accordingly, the glasses-type viewing device 195 illustrated in FIG. 1 may operate according to the 3D format.

FIG. 5(a) illustrates an exemplary operation of the 3D glasses 195, especially shutter glasses, when the formatter 360 outputs a 3D image in the frame sequential format illustrated in FIG. 4.

Referring to FIG. 5(a), when a left-eye image L is displayed on the display 180, the left lens is open and the right lens is shut off in the shutter glasses 195.

FIG. 5(b) illustrates an exemplary operation of the 3D glasses 195, especially polarized glasses, when the formatter 360 outputs a 3D image in the side by side format illustrated in FIG. 4. Meanwhile, the 3D glasses 915 applied to FIG. 5(b) may be shutter glasses. The shutter glasses may operate like polarized glasses as both the left and right lenses of the shutter glasses are kept open.

Meanwhile, the formatter 360 may convert a 2D video signal to a 3D video signal. For example, the formatter 360 may detect edges or a selectable object from the 2D video signal and generate a 3D video signal with an object based on the detected edges or the selectable object. As described before, the 3D video signal may be separated into left-eye and right-eye image signals L and R.

A 3D processor (not shown) may further be provided after the formatter 360, for processing a signal to exert 3D effects. For enhancing 3D effects, the 3D processor may adjust the brightness, tint, and color of a video signal. For example, the 3D processor may process a video signal so that a near area appears clear and a far area appears obscure. Meanwhile, the function of the 3D processor may be incorporated into the formatter 360 or the video processor 320, which will be described later with reference to FIG. 6.

The audio processor (not shown) of the controller 170 may process the demultiplexed audio signal. For the audio signal processing, the audio processor may have a plurality of decoders.

The audio processor of the controller 170 may also adjust the bass, treble, and volume of the audio signal.

The data processor (not shown) of the controller 170 may process the data signal obtained by demultiplexing the input stream signal. For example, if the demultiplexed data signal is a coded data signal, the data processor may decode the coded data signal. The coded data signal may be an EPG which includes broadcast information specifying the start time, end time, etc. of scheduled broadcast TV or radio programs.

While it is shown in FIG. 3 that the mixer 345 mixes signals received from the OSD generator 340 and the video processor 320 and then the formatter 360 performs 3D processing on the mixed signal, to which the present invention is not limited, the mixer 345 may be positioned after the formatter 360. Thus the formatter 360 may perform 3D processing on a signal received from the video processor 320, the OSD generator 340 may generate an OSD signal and subject the OSD signal to 3D processing, and then the mixer 345 may mix the processed 3D signals received from the formatter 360 and the OSD generator 340.

The block diagram of the image display apparatus 100 illustrated in FIG. 3 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Especially, the FRC 350 and the formatter 360 may be configured separately outside the controller 170.

Figure 6:
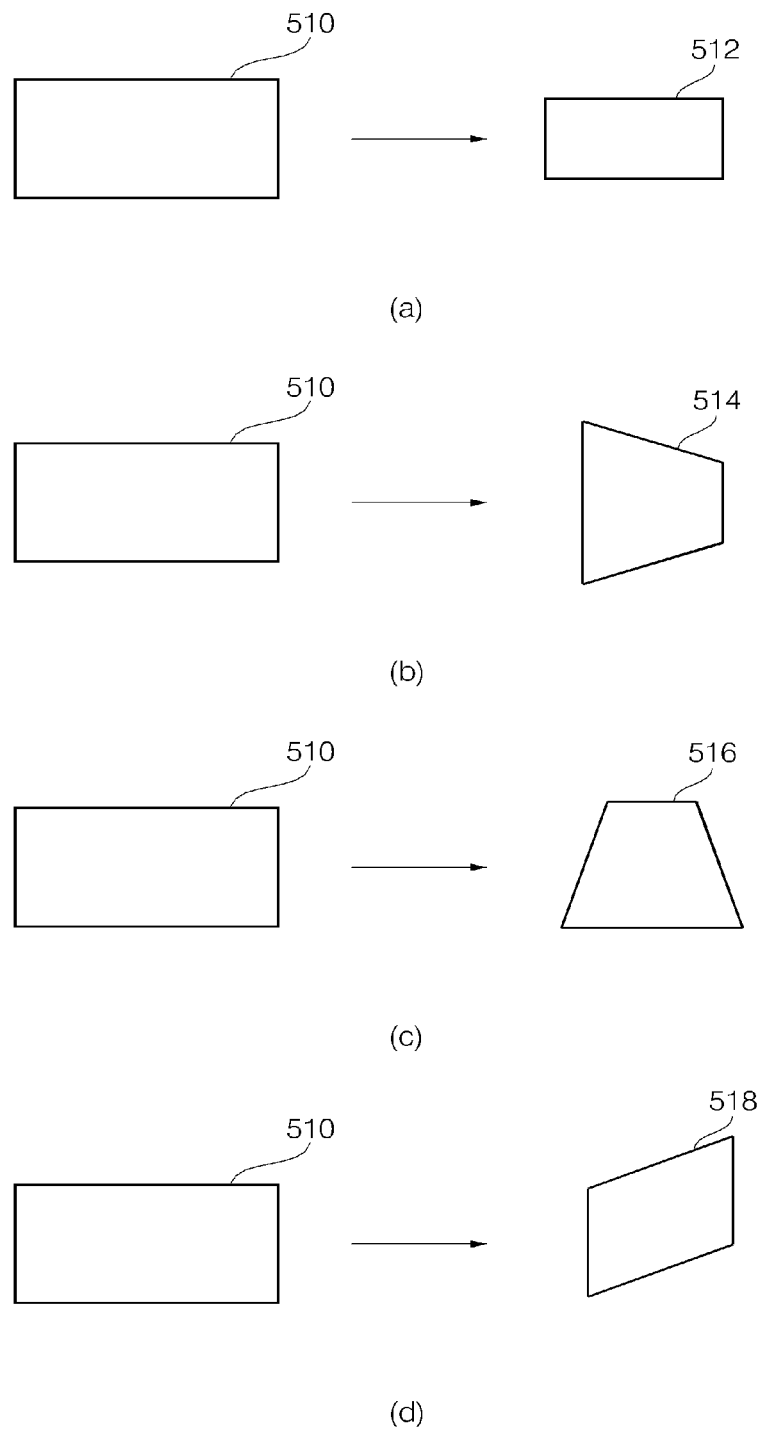
FIG. 6 illustrates various methods for scaling a 3D image according to an embodiment of the present invention.

FIG. 6 illustrates various methods for scaling a 3D image according to an embodiment of the present invention.

Referring to FIG. 6, to enhance 3D effects, the controller 170 may subject a video signal to 3D effect processing. Especially, the controller 170 may adjust the size or slope of a 3D object.

A whole 3D image or 3D object 510 may be scaled up or down at a predetermined ratio. Thus the 3D image or object 510 is contracted into a 3D image or object 523 in FIG. 6(a). As illustrated in FIGS. 6(b) and 6(c), the 3D object 510 may be partially scaled up or down to trapezoids 514 and 516. Referring to FIG. 6(d), the 3D object 510 may be at least partially rotated to be a parallelogram 518. Through scaling or slope control of a 3D image or object based on a 3D video signal, the controller 170 can reinforce the depth, that is, 3D effects of the 3D image or object.

As the slope of the 3D object 510 is increased, the length difference between parallel sides is also increased in each of the trapezoids 514 and 516 as illustrated in FIGS. 6(*b*) and 6(*c*) or a rotation angle increases as illustrated in FIG. 6(*d*).

The size control or slope control may be performed on a 3D video signal after the formatter 360 arranges the 3D video signal in a predetermined format. Or the scaler 235 of the video processor 320 may take charge of the size control or slope control. Meanwhile, it is also possible to transform a generated OSD into any of the shapes illustrated in FIG. 6 to reinforce 3D effects.

While note shown, a signal process such as control of the brightness, tint, and color of a video signal or an object as well as the size or slope control illustrated in FIG. 6 may be performed for 3D effects. For instance, a video signal may be processed such that a near area appears clear and a far area appears obscure. The controller 170 or a separately secured 3D processor may be responsible for the 3D effect signal processing. Especially in the former case, the formatter 360 or the video processor 320 may take charge of the 3D effect signal processing along with the above-described size or slope control.

Figure 7:
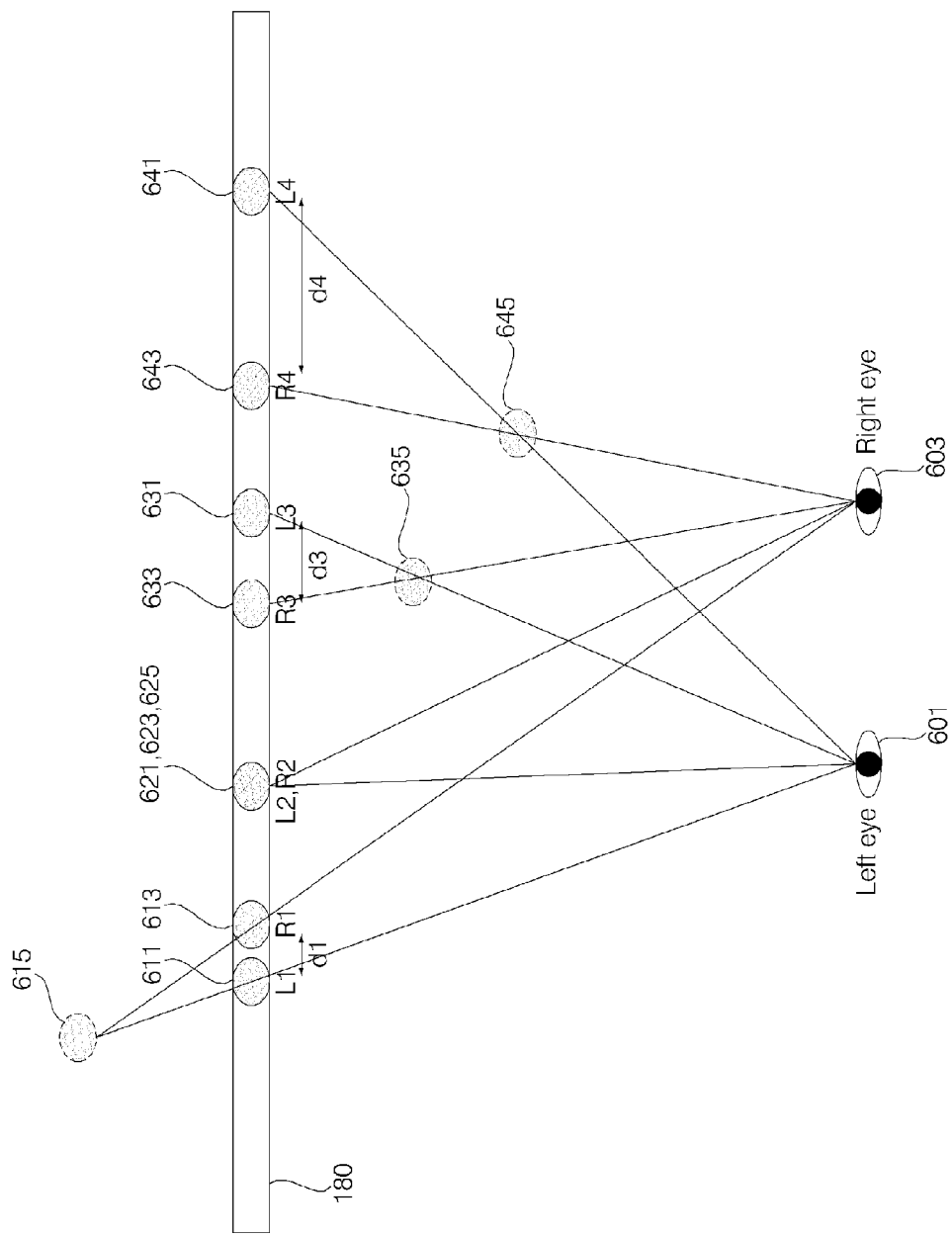
FIG. 7 illustrates formation of 3D images by combining left-eye and right-eye images.
Figure 8:
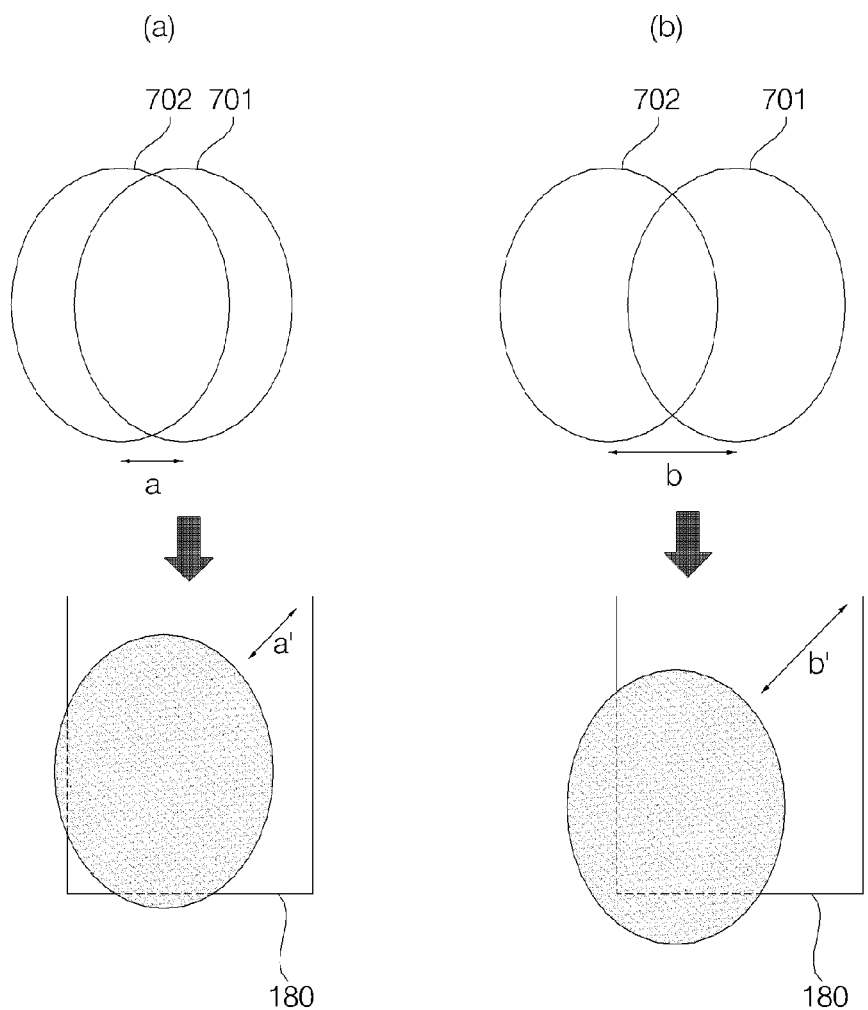
FIG. 8 illustrates different depth illusions of 3D images according to different disparities between a left-eye image and a right-eye image.

FIG. 7 illustrates formation of 3D images by combining left-eye and right-eye images, and FIG. 8 illustrates different depth illusions according to different disparities between a left-eye image and a right-eye image.

Referring to FIG. 7, there are a plurality of images or objects 615, 625, 635 and 645.

A first object 615 is created by combining a first left-eye image 611 (L1) based on a first left-eye image signal with a first right-eye image 613 (R1) based on a first right-eye image signal, with a disparity d1 between the first left-eye and right-eye images 611 and 613. The user sees an image as formed at the intersection between a line connecting a left eye 601 to the first left-eye image 611 and a line connecting a right eye 603 to the first right-eye image 613. Therefore, the user is tricked into perceiving the first object 615 as located behind the display 180.

As a second object 625 is created by overlapping a second left-eye image 621 (L2) with a second right-eye image 623 (R2) on the display 180, thus with a disparity of 0 between the second left-eye and right-eye images 621 and 623. Thus, the user perceives the second object 625 as on the display 180.

A third object 635 is created by combining a third left-eye image 631 (L3) with a third right-eye image 633 (R3), with a disparity d3 between the third left-eye and right-eye images 631 and 633. A fourth object 645 is created by combining a fourth left-eye image 641 (L4) with a fourth right-eye image 643 (R4), with a disparity d4 between the fourth left-eye and right-eye images 641 and 643.

The user perceives the third and fourth objects 635 and 645 at image-formed positions, that is, as positioned before the display 680.

Because the disparity d4 between the fourth left-eye and right-eye images 641 and 643 is larger than the disparity d3 between the third left-eye and right-eye images 631 and 633, the fourth object 645 appears more protruding than the third object 635.

In embodiments of the present invention, the distances between the display 180 and the objects 615, 625, 635 and 645 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIG. 8, the disparity a between a left-eye image 701 and a right-eye image 702 in FIG. 8(*a*) is smaller than the disparity b between the left-eye image 701 and the right-eye image 702 in FIG. 8(*b*). Consequently, the depth a' of a 3D object created in FIG. 8(*a*) is smaller than the depth b' of a 3D object created in FIG. 8(*b*).

In the case where a left-eye image and a right-eye image are combined into a 3D image, if the left-eye and right-eye images of 3D images are apart from each other by different disparities, the 3D images are perceived to the user as formed at different positions. This means that the depth of a 3D image or 3D object formed with a left-eye image and a right-eye image in combination may be controlled by adjusting the disparity of the left-eye and right-eye images.

Figure 9:
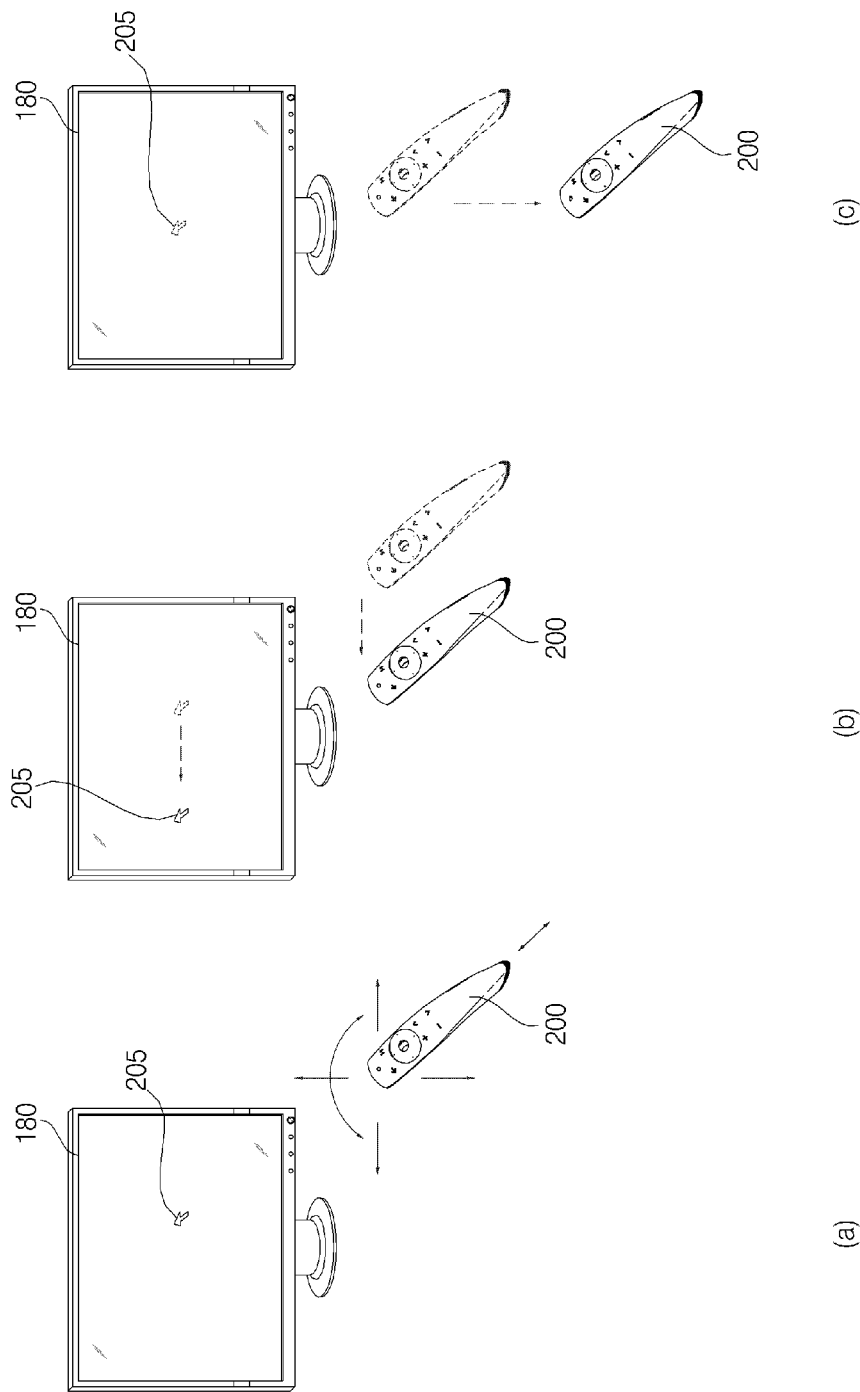
FIG. 9 illustrates a method for controlling a remote controller illustrated in FIG. 1.

FIG. 9 illustrates a method for controlling the remote controller illustrated in FIG. 1 according to an embodiment of the present invention.

FIG. 9(*a*) illustrates a pointer 205 representing movement of the remote controller 200 displayed on the display 180.

The user may move or rotate the remote controller 200 up and down, side to side (FIG. 9(*b*)), and back and forth (FIG. 9(*c*)). Since the pointer 205 moves in accordance with the movement of the remote controller 200, the remote controller 200 may be referred to as a pointing device.

Referring to FIG. 9(*b*), if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 9(*c*), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 10:
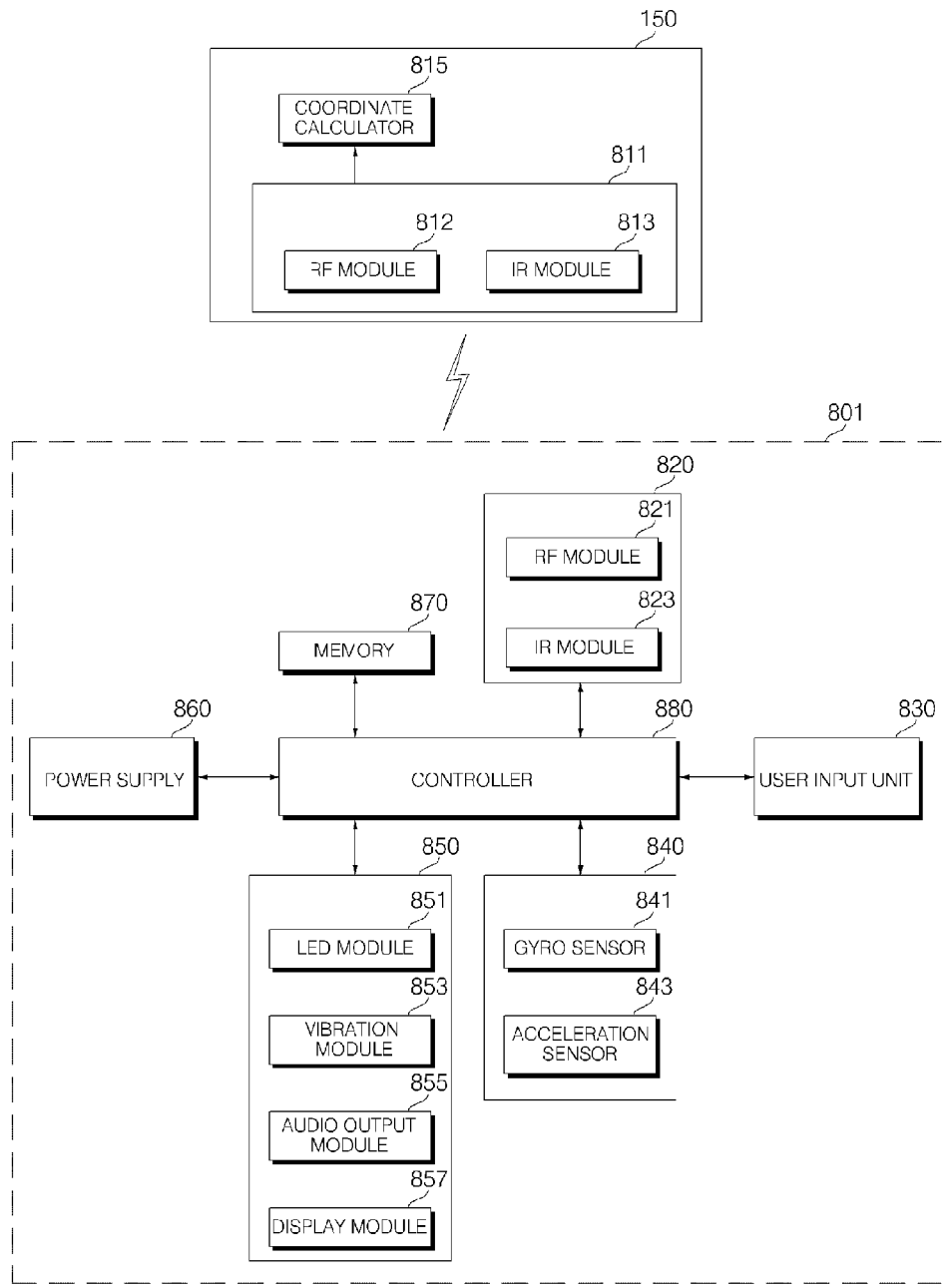
FIG. 10 is a block diagram of the remote controller illustrated in FIG. 1.

FIG. 10 is a block diagram of the remote controller illustrated in FIG. 1.

Referring to FIG. 10, a remote controller 801 may include a wireless communication module 820, a user input unit 830, a sensor unit 840, an output unit 850, a power supply 860, a memory 870, and a controller 880.

The wireless communication module 820 may transmit signals to and/or receive signals from the image display apparatus 100.

In the embodiment of the present invention, the wireless communication module 820 may include an RF module 821 for transmitting RF signals to and/or receiving RF signals from the image display apparatus 100 according to an RF communication standard. The wireless communication module 820 may also include an IR module 823 for transmitting IR signals to and/or receiving IR signals from the image display apparatus 100 according to an IR communication standard.

The remote controller 801 transmits motion information regarding the movement of the remote controller 801 to the image display apparatus 100 through the RF module 821 in the embodiment of the present invention.

The remote controller 801 may also receive signals from the image display apparatus 100 through the RF module 821. The remote controller 801 may transmit commands, such as a power on/off command, a channel switching command, or a sound volume change command, to the image display apparatus 100 through the IR module 823, as needed.

The user input unit 830 may include a keypad, a plurality of buttons, and/or a touch screen. The user may enter commands to the image display apparatus 100 by manipulating the user input unit 830. If the user input unit 830 includes a plurality of hard-key buttons, the user may input various commands to the image display apparatus 100 by pressing the hard-key buttons. Alternatively or additionally, if the user input unit 830 includes a touch screen displaying a plurality of soft keys, the user may input various commands to the image display apparatus 100 by touching the soft keys. The user input unit 830 may also include various input tools other than those set forth herein, such as a scroll key and/or a jog key, which should not be construed as limiting the present invention.

The sensor unit 840 may include a gyro sensor 841 and/or an acceleration sensor 843. The gyro sensor 841 may sense the movement of the pointing device 301, for example, in X-, Y-, and Z-axis directions, and the acceleration sensor 843 may sense the moving speed of the remote controller 801. The sensor unit 840 may further include a distance sensor for sensing the distance between the remote controller 801 and the display 180.

The output unit 850 may output a video and/or audio signal corresponding to a manipulation of the user input unit 830 or a signal transmitted by the image display apparatus 100. The user may easily identify whether the user input unit 830 has been manipulated or whether the image display apparatus 100 has been controlled based on the video and/or audio signal output by the output unit 850.

The output unit 850 may include a Light Emitting Diode (LED) module 851 which is turned on or off whenever the user input unit 830 is manipulated or whenever a signal is received from or transmitted to the image display apparatus 100 through the wireless communication module 820, a vibration module 853 which generates vibrations, an audio output module 855 which outputs audio data, and a display module 857 which outputs an image.

The power supply 860 supplies power to the remote controller 801. If the remote controller 801 is kept stationary for a predetermined time or longer, the power supply 860 may, for example, reduce or cut off supply of power to the remote controller 801 in order to save power. The power supply 860 may resume supply of power if a specific key on the remote controller 801 is manipulated.

The memory 870 may store various application data for controlling or operating the remote controller 801. The remote controller 801 may wirelessly transmit signals to and/or receive signals from the image display apparatus 100 in a predetermined frequency band through the RF module 821. The controller 880 of the remote controller 801 may store information regarding the frequency band used for the remote controller 801 to wirelessly transmit signals to and/or wirelessly receive signals from the paired image display apparatus 100 in the memory 870 and may then refer to this information for use at a later time.

The controller 880 provides overall control to the remote controller 801. For example, the controller 880 may transmit a signal corresponding to a key manipulation detected from the user input unit 830 or a signal corresponding to motion of the remote controller 801, as sensed by the sensor unit 840, to the image display apparatus 100 through the wireless communication module 820.

Now a description will be given of methods for operating the image display apparatus according to embodiments of the present invention with reference to FIGS. 11 to 24.

Figure 11:
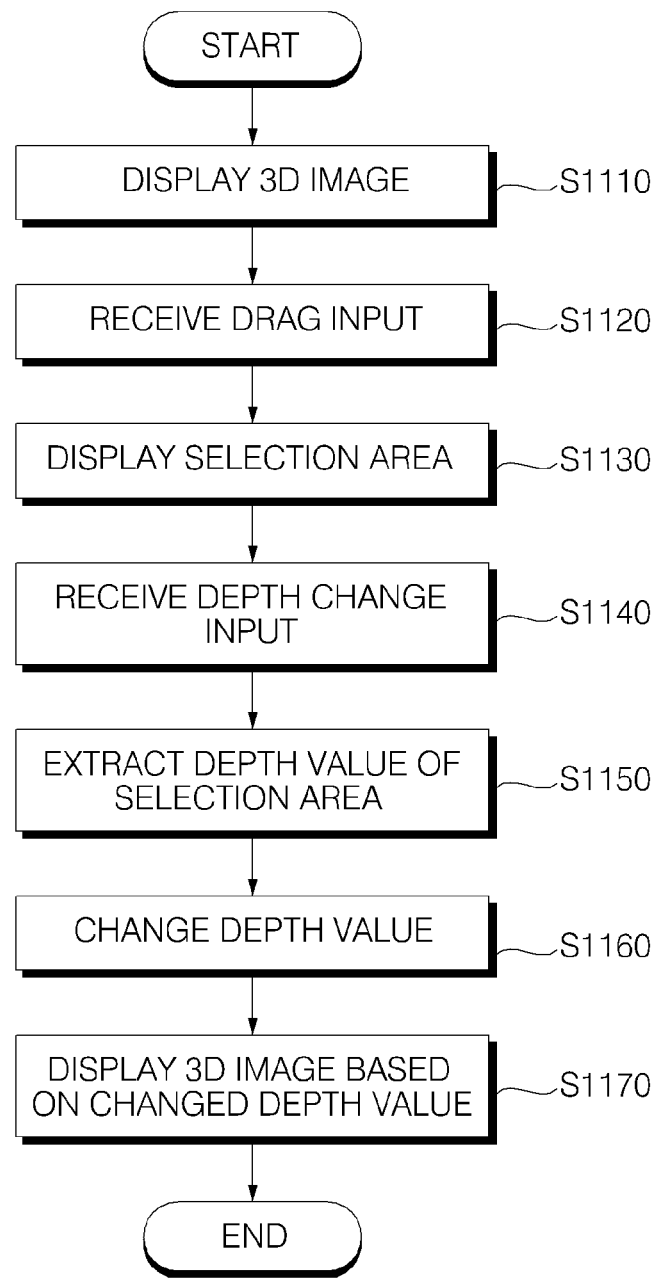
FIG. 11 is a flowchart illustrating a method for operating the image display apparatus according to an embodiment of the present invention.

FIG. 11 is a flowchart illustrating a method for operating the image display apparatus according to an embodiment of the present invention and FIGS. 12 to 17 are views referred to for describing various examples of the method for operating the image display apparatus, illustrated in FIG. 11.

Referring to FIG. 11, a 3D image is displayed (S1110).

The 3D image may be based on a signal received from an external device or a network. The 3D image may include content stored in the image display apparatus or a 3D OSD generated from the image display apparatus.

While a 3D zone screen, which is displayed when 3D mode is entered, is taken as an example of a 3D image displayed on the display in the following description, it is to be clearly understood that the 3D image may be a video or a still image like a photo.

The 3D mode may be placed manually by a user input. For example, when the remote controller 200 or local keys (not shown) include a hot key designated for triggering the 3D mode, the 3D mode may be entered by input of the hot key.

Alternatively or additionally, with a home screen displayed on the display 180, an object representing the 3D mode may be selected, thus triggering the 3D mode.

FIG. 12A illustrates an exemplary display of a home screen 1220 on the display 180. The home screen 1220 may be a home screen for a smart TV, including an area in which a broadcast image 1230 is displayed, a card object area in which movable or replaceable card objects 1240 and 1250 are displayed, and an application area in which bookmarks or an application menu 1260 is displayed.

In FIG. 12A, there are the CP card object 1240 representing a CP list and the application card object 1250 representing an application list, by way of example. Especially a 3D zone application item 1255 is included in the application card object 1250.

Figure 12B:
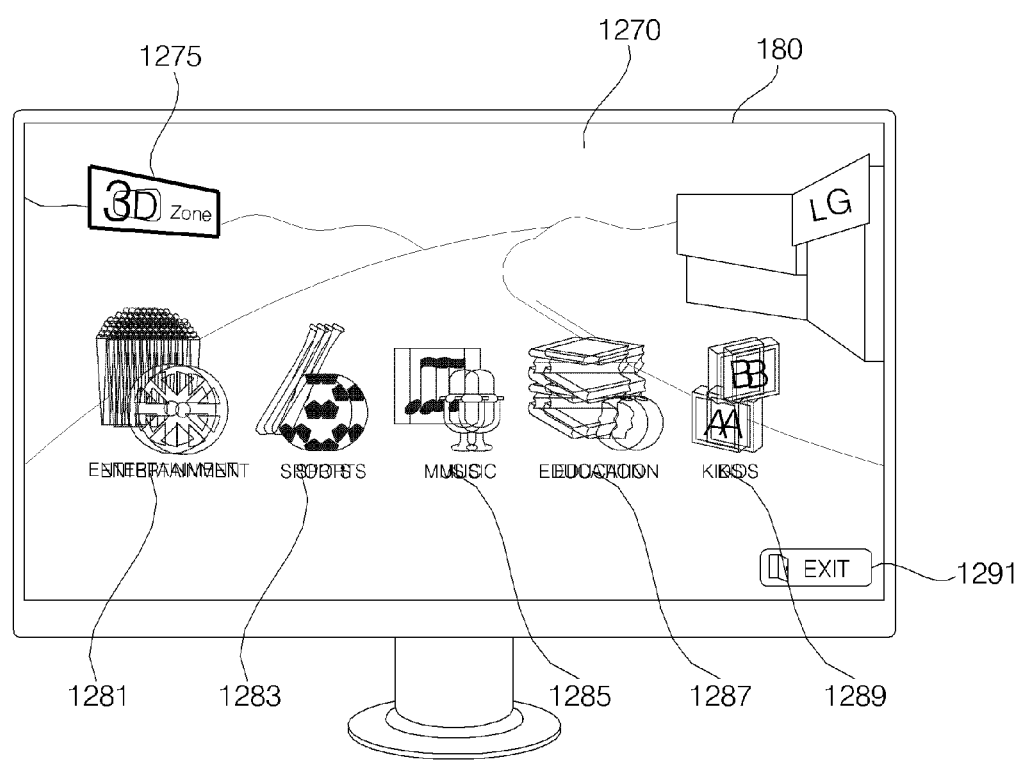

Upon selection of the 3D zone application item 1255, the home screen 1220 is switched to a 3D zone screen 1270 as illustrated in FIG. 12B.

The user may use the remote controller, especially a pointing device to select the 3D zone application item 1255. That is, the 3D zone application item 1255 may be selected using a pointer that moves in correspondence with the remote controller 200.

Referring to FIG. 12B, the 3D zone screen 1270 may include 3D OSDs 1281, 1283, 1285, 1287, and 1289 and an Exit menu item 1291. The 3D zone screen 1270 may further include an OSD 1275 indicating a 3D zone screen.

The 3D OSDs 1281, 1283, 1285, 1287, and 1289 are labeled respectively with 'Entertainment', 'Sports', 'Music', 'Education', and 'Kids' objects. As the 3D OSDs 1281, 1283, 1285, 1287, and 1289 are classified by content type, the user can readily select intended content.

The Exit menu item 1291 and the 3D zone screen-indicating OSD 1275 may be displayed in the form of 3D OSDs.

The 3D image 1270 is shown in FIG. 12B as viewed by the user without wearing glasses, when the 3D image 1270 is configured to be viewed through 3D glasses. Therefore, some slight doubling is noticed from the 3D OSDs 1281, 1283, 1285, 1287, and 1289, when observed without glasses.

FIG. 12C illustrates the 3D image 1270 observed through the 3D glasses 195, in case of 3D visualization requiring 3D glasses. Referring to FIG. 12C, the 3D OSDs 1281, 1283, 1285, 1287, and 1289 may appear protruding with respective depths $d_a$, $d_b$, $d_c$, $d_d$, and $d_e$.

The term "OSD" may refer to a Graphic User Interface (GUI) or an object generated from the OSD generator 340 illustrated in FIG. 3.

In another example of entering the 3D mode, with a menu displayed on the display 180, an object indicating the 3D mode may be selected, thus triggering the 3D mode.

Figure 13A:
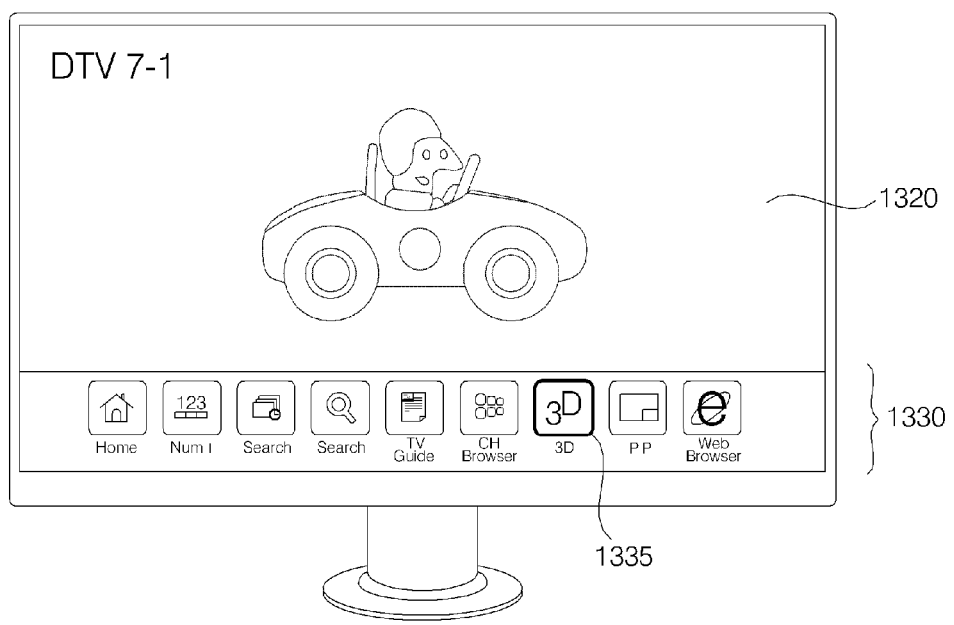

FIG. 13A is an exemplary view illustrating a menu 1330 displayed on the display 180, while an image 1320 is being displayed on the display 180. The menu 1330 may be displayed by manipulating the remote controller 200 or a menu key as a local key.

Referring to FIG. 13A, the menu 1330 includes a Home menu item for directing back to the home screen, a Num+ menu item representing broadcast channel numbers, a Search menu item representing a last viewed channel, another Search menu item for a search operation, a TV Guide menu item, a CH Browser menu item, a 3D menu item 1335 for switching to the 3D mode, a Picture-In-Picture (PIP) menu item, and a Web Browser menu item.

Figure 13B:
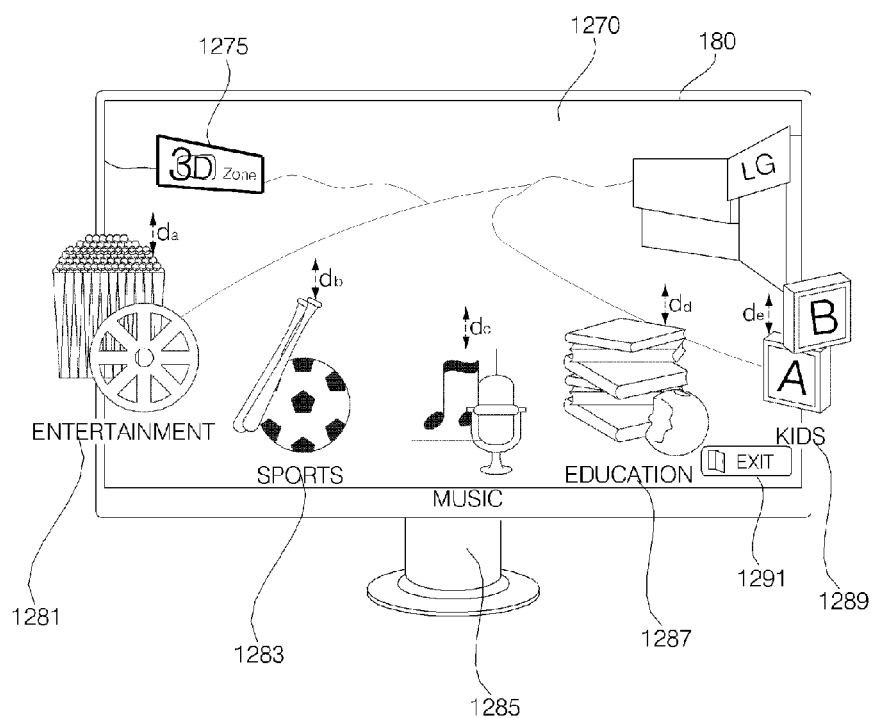

Upon selection of the 3D menu item 1335 among the menu items, the 3D zone screen 1270 may be displayed as illustrated in FIG. 13B.

The user may select the 3D menu item 1335 using the remote controller 200, especially a pointing device. That is, the 3D menu item 1335 may be selected using a pointer that moves in correspondence with movement of the remote controller 200.

The 3D zone screen 1270 is a 3D home screen which may include the 3D OSDs 1281, 1283, 1385, 1287, and 1289 representing content types and the Exit menu item 1291.

Meanwhile, the 3D mode may be entered automatically. For example, when the user puts on the 3D viewing device 195, the image display apparatus 100 may sense the user's wearing of the 3D viewing device 195 and thus may automatically enter the 3D mode. Such sensing of wearing a viewing device may be performed by the afore-described camera module (not shown).

With the automatic transitioning to the 3D mode, the 3D zone screen 1270 may be displayed as illustrated in FIG. 13B. The 3D zone screen 1270 may include the 3D OSDs 1281, 1283, 1385, 1287, and 1289 representing content types and the Exit menu item 1291.

Subsequently, upon receipt of a pointer drag input in correspondence with movement of the remote controller (S1120), a selection area is determined and displayed according to the pointer drag input (S1130). That is, the selection area to which the pointer has been dragged is displayed.

Figure 14:
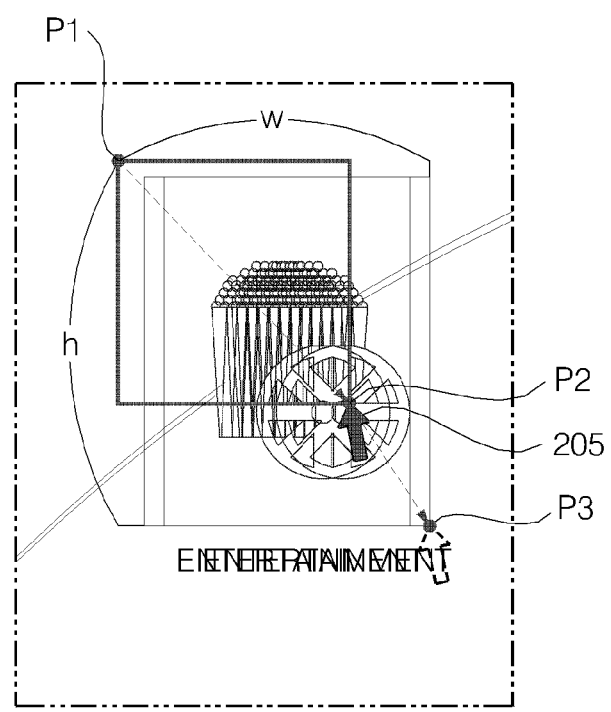

Referring to FIG. 14, the user may drag a pointer 205 from point P1 to point P3 through point P2 using the remote controller.

When the pointer is moved with a first button (e.g. an OK button) pressed in the remote controller, a drag input is generated.

That is, if the remote controller is moved with the first button pressed, the pointer is dragged. On the other hand, if the remote controller is moved with the first button not pressed, the pointer is just shifted.

In accordance with the embodiment of the present invention, coordinate information about the selection area may be further generated. Once the selection area is determined, its coordinate information may be generated and managed.

The coordinate information about the selection area may include information about the width w and height h (or distance), or radius r of the selection area with respect to the starting point P1 as well as the (x, y) coordinates of the starting point P1. For example, the coordination information may take the form of (x, y, w, h) if the selection area is square, and the coordination information may take the form of (x, y, r) if the selection area is circular.

Meanwhile, a depth change input is received for the selection area (S1140).

Figure 16A:
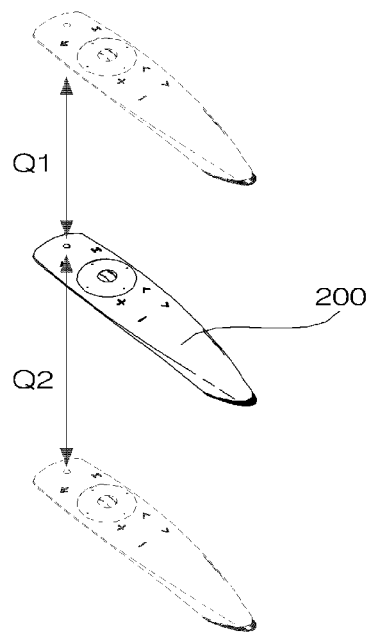

The depth change input may be generated by moving the remote controller nearer to or farther from the display, with the first button pressed in the remote controller, as illustrated in FIG. 16A.

Figure 16B:
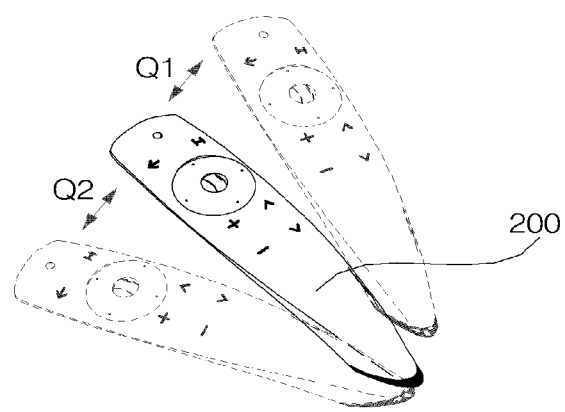

Or the depth change input may be generated by tilting the remote controller, with the first button pressed in the remote controller, as illustrated in FIG. 16B.

On the assumption that the drag input is generated by moving the remote controller in the (x, y)-axis direction with the first button kept pressed and the depth change input is generated by taking a predetermined action with the first button kept pressed, the depth change input may be generated successively to the drag input.

Or the drag input and the depth change input may be differentiated by assigning different buttons to both operations.

Depth values of the selection area are extracted (S1150).

Specifically, the depth values of respective coordinates within the selection area may be extracted directly.

Or per-coordinates depth values are first extracted from the entire 3D image. Then, depth values corresponding to the coordinate information about the selection area are selected from the total per-coordinates depth values.

The depth values of the selection area are changed (S1160) and a 3D image is displayed according to the changed depth values (S1170).

In accordance with an embodiment of the present invention, the image display apparatus may decrease a 3D depth value as illustrated in FIG. 15(a) or increase it as illustrated in FIG. 15(b) so as to change 3D effects between a background and a specific object or the degree to which the specific object appears protruding.

In the case where per-coordinates depth values are extracted from the entire area of a 3D image in the process of changing the depth values of the selection area, the depth values may be stored per coordinates in the form of z(x, y). To decrease a 3D depth value as illustrated in FIG. 15(a), the depth value z'(x, y) may be changed to 0.5*z'(x, y). To increase the 3D depth value as illustrated in FIG. 15(b), the depth value z'(x, y) may be changed to 2*z'(x, y).

That is, the depth value of intended coordinates may be changed by multiplying a scaling factor such as 0.5 or 2 by the depth value of the coordinates.

In step S1160, the depth value may be changed in proportion to the distance for which the remote controller has moved.

If the depth change input is generated by moving the remote controller away from the display for a distance of Q1 or toward the display for a distance of Q2 while the first button is kept pressed in the remote controller, as illustrated in FIG. 16A, a depth value may be increased or decreased in proportion to Q1 or Q2.

If the depth change input is generated by tilting the remote controller while the first button is kept pressed in the remote controller, as illustrated in FIG. 16B, a depth value may be increased in proportion to a tilting angle in a first direction or decreased in proportion to a tilting angle in a second direction.

A depth variation q may be internally managed along with the coordinate information.

FIG. 17 illustrates an example in which a selection area 1711 appears more protruding due to its increased depth value $d_f$.

Figure 19A:
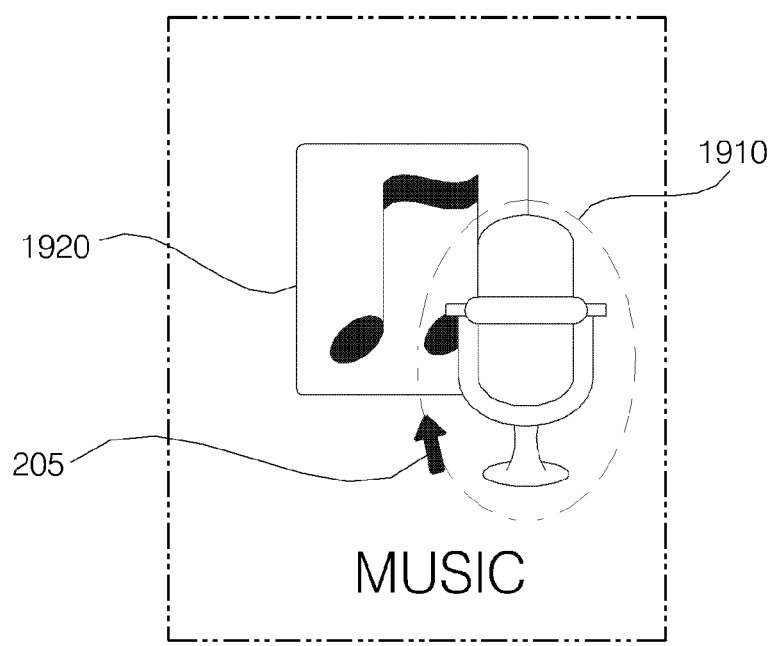
FIGS. 19 and 20 are views referred to for describing various examples of the method for operating the image display apparatus, illustrated in FIG. 18.
Figure 19B:
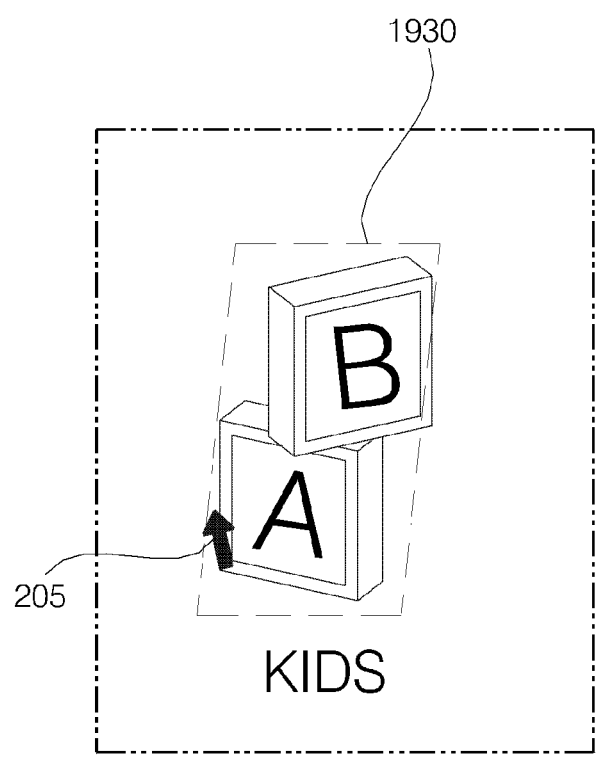
Figure 20:
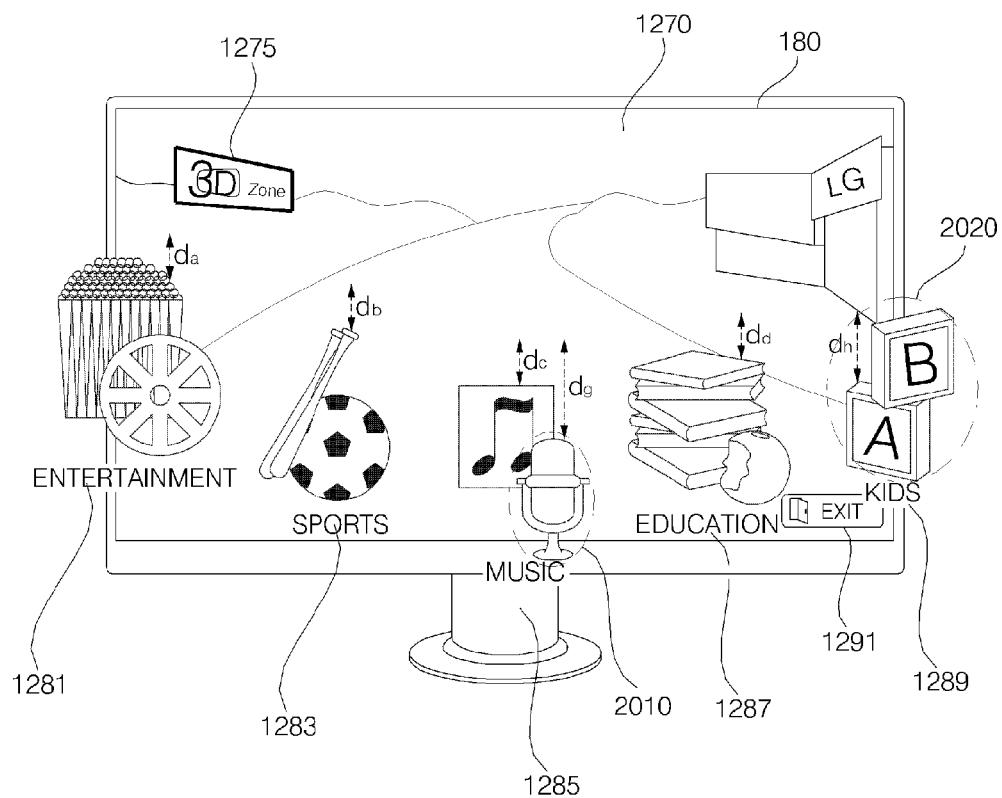

FIG. 18 is a flowchart illustrating a method for operating the image display apparatus according to another embodiment of the present invention, and FIGS. 19 and 20 are views referred to for describing various examples of the method for operating the image display apparatus, illustrated in FIG. 18.

A method for operating the image display apparatus according to another embodiment of the present invention may include displaying a 3D image (S1810), receiving a shift input for moving a pointer in correspondence with movement of a remote controller (S1820), moving the pointer (S1830), and extracting a depth value of an object displayed within a reference distance from an area to which the pointer has moved (S1840).

As illustrated in FIGS. 19A and 19B, an object within a reference distance set with respect to the position of the pointer 205 may be selected and a depth value of the object may be extracted.

In step S1840, depth values within the reference distance may be extracted and then the depth value of an area across which the depth value is same may be determined as the depth value of the object. That is, an area across which a depth value is identical may be identified as an object and selected, without the need for using an object identifying algorithm.

When needed, one of two objects 1910 and 1920 may be selected as illustrated in FIG. 19A, or a plurality of objects 1930 may be selected as illustrated in FIG. 19B.

Upon receipt of a depth change input for the object (S1850), the depth value of the object is changed (S1860). Then a 3D image is displayed according to the changed depth value (S1870).

FIG. 20 illustrates an example in which objects are selected as illustrated in FIGS. 19A and 19B, the depth values of the objects are changed, and then 3D images are displayed according to the changed depth values.

Referring to FIG. 20, selected objects 2010 and 2020 appear more protruding due to their increased depth values $d_g$ and $d_h$.

Compared to the embodiment of the present invention described before with reference to FIGS. 11 to 17 in which a selection area is determined and then its depth values are changed, this embodiment is characterized in that an object on which a pointer is located is selected and its depth value is changed. Therefore, this embodiment may be implemented in the same manner as or in a similar manner to the aforedescribed embodiment of FIGS. 11 to 17.

For example, a depth change input may be generated by moving the remote controller nearer to the display or moving the remote controller farther from the display, with the first button kept pressed in the remote controller.

In this case, a depth value may be changed in proportion to the distance for which the remote controller has moved in step S1860.

Or the depth change input may be generated by tilting the remote controller, with the first button kept pressed in the remote controller.

In this case, the depth value may be increased in proportion to a tilting angle of the remote controller in a first direction or decreased in proportion to a tilting angle of the remote controller in a second direction in step S1860.

In accordance with an embodiment of the present invention, a method for operating the image display apparatus may include displaying a pointer in correspondence with movement of the remote controller and selecting a specific object according to the position of the pointer (S1835) as illustrated in FIG. 18. Herein, a depth value of the selected object is changed in the depth change step S1860.

That is, an object displayed at the position of the pointer may be automatically selected by a known object identifying algorithm such as edge detection. Or an object nearest to the pointer may be automatically selected.

Figure 21:
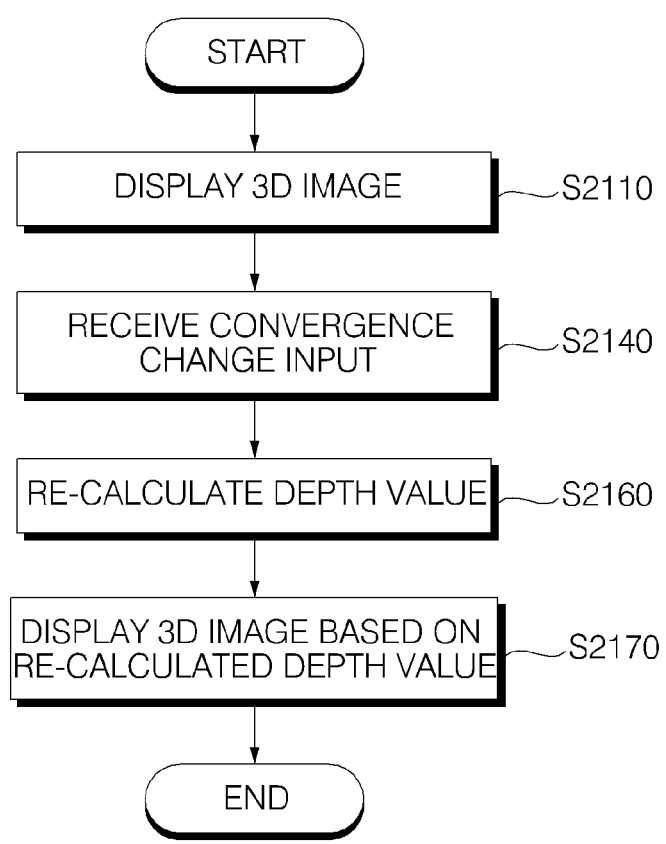
FIG. 21 is a flowchart illustrating a method for operating the image display apparatus according to a further embodiment of the present invention.
Figure 22:
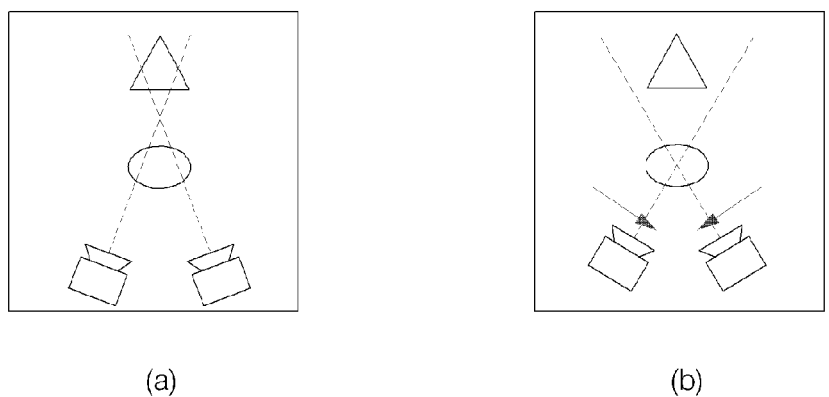
FIGS. 22 to 24 are views referred to for describing various examples of the method for operating the image display apparatus, illustrated in FIG. 21.
Figure 23:
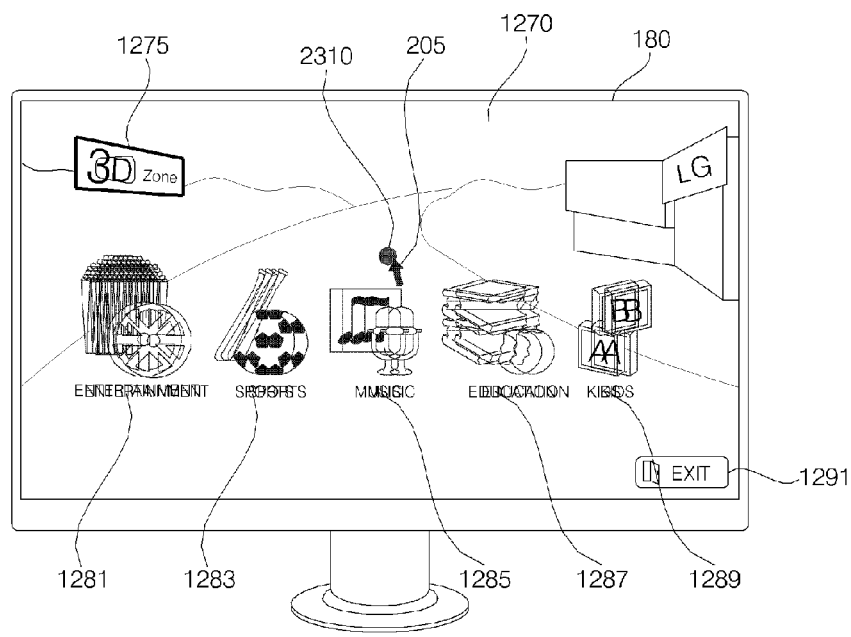
Figure 24:
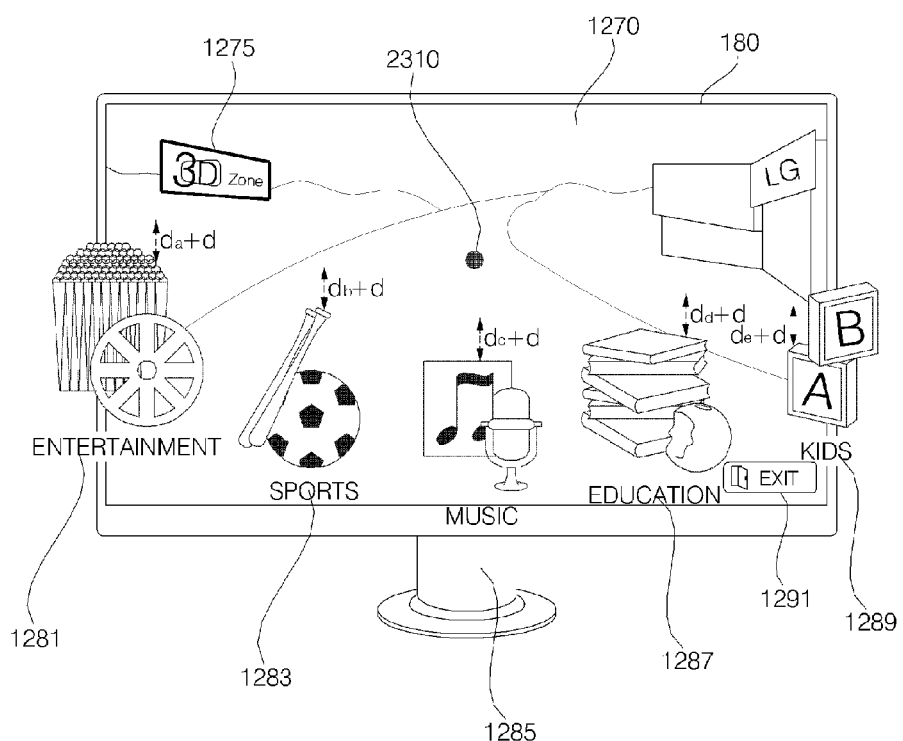

FIG. 21 is a flowchart illustrating a method for operating the image display apparatus according to a further embodiment of the present invention, and FIGS. 22 to 24 are views referred to for describing various examples of the method for operating the image display apparatus, illustrated in FIG. 21.

A method for operating the image display apparatus according to a further embodiment of the present invention may include displaying a 3D image (S2110) and receiving a depth change input, especially a convergence change input (S2140).

It may be further contemplated as another embodiment of the present invention that the depth change input is received irrespective of movement of the pointer (S2140) and if the depth change input is determined to be a convergence change input, a depth value of the 3D image is immediately re-calculated based on the convergence change input (S2160).

The convergence change input may be generated by moving the remote controller nearer to or farther from the display, with the first button pressed in the remote controller.

Or, the convergence change input may be generated by double-clicking an OK key.

Or, the method may further include determining the depth change input to be the convergence change input, if a pointer is displayed in correspondence with movement of the remote controller and there is no object at the position of the pointer at the moment the depth change input is received.

Then, the controller 170 may re-calculate depth values based on the received depth change input, that is, the convergence change input and may change the entire depth values of the 3D image (S2160).

It may further be contemplated as another embodiment that the method for operating the image display apparatus includes receiving a shift input for moving the pointer in correspondence with the remote controller and moving the pointer, and the controller 170 changes a convergence based on the coordinates of the pointer, upon receipt of a convergence change input, and re-calculates a depth value based on the changed convergence (S2160).

Then, a 3D image is displayed based on the re-calculated depth values (S2170).

The image display apparatus of the present invention may change a convergence setting value in order to change the overall 3D effect of an image as illustrated in FIG. 22. A sense of stereoscopy that a person perceives with his or her two eyes is attributed to convergence-based binocular disparity. The coordinates of objects included in the left-eye and right-eye images of a 3D image may be different vertically or horizontally.

Changing a convergence may mean control of the difference between the coordinates of objects in the left-eye and right-eye images, namely the binocular disparity.

A viewer adjusts the disparity of an intended object by moving his or her left and right eye pupils. When the disparity is a specific value, the viewer may observe a 3D image most comfortably. On the other hand, if the convergence is not appropriate, the 3D image looks doubled or blurry.

Meanwhile, the total depth values of the 3D image may be changed by adding or subtracting the same value to or from the depth values of the 3D image.

Or, the coordinates of the pointer may be set as a reference point 2310 as illustrated in FIG. 23 and the total depth values of an image may be re-adjusted with respect to the reference point 2310 in the convergence changing step. As a consequence, objects located before the reference point 2310 may look more protruding.

In step S2160, the depth values may be changed in proportion to the distance for which the remote controller has moved.

Although total per-coordinates depth values are not necessarily extracted to change the convergence, the total per-coordinates depth values of the 3D image may further be extracted in accordance with an embodiment of the present invention.

In this case, the same value d is added to or subtracted from the total per-coordinates depth values in step S2160, as illustrated in FIG. 24.

For instance, a depth value z'(x, y) may be changed to z(x, y)−6 in order to change a convergence as illustrated in FIG. 22(*a*) and to z(x, y)+6 in order to change a convergence as illustrated in FIG. 22(*b*).

That is, the same value d (e.g. −6 or +6) may be added to or subtracted from the total depth values of an image.

According to the present invention, a depth change area may be drawn directly on a screen or may be selected for each object, using a remote controller and then a depth value may be adjusted.

In addition, the convergence of an image may be adjusted using the remote controller.

Therefore, 3D image setting can be facilitated in various manners and user convenience can be increased.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, the method comprising:
   displaying a three-dimensional (3D) image;
   receiving a shift input for moving a pointer in correspondence with movement of a remote controller;
   displaying the pointer in correspondence with the movement of the remote controller;
   extracting a depth value of an object displayed within a reference distance from an area to which the pointer has moved;
   receiving a depth change input for changing a depth value of the object;
   changing the depth value according to the depth change input;
   displaying a 3D image based on the changed depth value; and
   determining that the depth change input is a convergence change input, in the absence of an object displayed at a position of the pointer at the moment the depth change input is received,
   wherein depth values are extracted within the reference distance,
   a depth value of an area is extracted, across which the depth value of the area is identical to the depth value of the object, and
   wherein if the depth change input is a convergence change input, depth values of the 3D image are re-calculated according to the convergence change input.

2. The method according to claim 1, further comprising:
   receiving a drag input corresponding to dragging the pointer in correspondence with movement of the remote controller; and
   displaying a selection area determined by the drag input of the pointer,
   wherein the depth changing comprises changing a depth of the selection area.

3. The method according to claim 2, further comprising generating coordinate information about the selection area.

4. The method according to claim 2, further comprising extracting per-coordinates depth values of an entire area of the 3D image.

5. The method according to claim 2, wherein the drag input is generated by moving the pointer while pressing a button on the remote controller.

6. The method according to claim 1, further comprising:
   selecting a specific object based on a position of the pointer,
   wherein the depth value changing comprises changing a depth value of the selected object.

7. The method according to claim 1, wherein the depth value recalculation comprises changing the depth values of the 3D image by adding or subtracting the same value to or from the depth values of the 3D image.

8. The method according to claim 1, further comprising extracting per-coordinates depth values of an entire area of the 3D image.

9. The method according to claim 8, wherein the depth value recalculation comprises changing the depth values of the 3D image by adding or subtracting the same value to or from the per-coordinates depth values of the entire area of the 3D image.

10. The method according to claim 1, wherein the depth change input is generated by moving the remote controller farther from the display or nearer to a display while pressing a button on the remote controller.

11. The method according to claim 10, wherein the depth changing comprises changing the depth value in proportion to a distance for which the remote controller has moved.

12. The method according to claim 1, wherein the depth change input is generated by tilting the remote controller while pressing a button on the remote controller.

13. The method according to claim 12, wherein the depth changing comprises increasing the depth value in proportion to a tilting angle of the remote controller in a first direction and decreasing the depth value in proportion to a tilting angle of the remote controller in a second direction.

* * * * *